United States Patent
Longo et al.

(10) Patent No.: US 12,131,031 B2
(45) Date of Patent: *Oct. 29, 2024

(54) AUTOMATED TUNING OF A QUALITY OF SERVICE SETTING FOR A DISTRIBUTED STORAGE SYSTEM BASED ON INTERNAL MONITORING

(71) Applicant: NetApp, Inc., San Jose, CA (US)

(72) Inventors: Austino Longo, Lafayette, CO (US); Tyler W. Cady, Denver, CO (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/346,672

(22) Filed: Jul. 3, 2023

(65) Prior Publication Data
US 2023/0367484 A1 Nov. 16, 2023

Related U.S. Application Data

(63) Continuation of application No. 17/237,488, filed on Apr. 22, 2021, now Pat. No. 11,693,563.

(51) Int. Cl.
*G06F 3/06* (2006.01)
*G06F 11/34* (2006.01)

(52) U.S. Cl.
CPC .......... *G06F 3/0613* (2013.01); *G06F 3/0631* (2013.01); *G06F 3/0653* (2013.01); *G06F 3/067* (2013.01); *G06F 11/3419* (2013.01)

(58) Field of Classification Search
CPC ...... G06F 3/061; G06F 3/0613; G06F 3/0631; G06F 3/0653; G06F 3/0659; G06F 3/067;
(Continued)

(56) References Cited

U.S. PATENT DOCUMENTS 7,181,607 B2   2/2007   Ido et al.
9,003,021 B2   4/2015   Wright et al.
(Continued)

OTHER PUBLICATIONS

Baker R., "SolidFire, vVols, and QoS Noisy Neighbor Issues," Baker's Cloudy World, 2019, 17 pages. URL : https://ryanbaker.io/2019-09-03-solidfire-and-vvols/.
(Continued)

*Primary Examiner* — Ilwoo Park
(74) *Attorney, Agent, or Firm* — Jaffery Watson Hamilton & DeSanctis LLP

(57) ABSTRACT

Systems and methods for automated tuning of Quality of Service (QoS) settings of volumes in a distributed storage system are provided. According to one embodiment, one or more characteristics of a workload of a client to which a storage node of multiple storage nodes of the distributed storage system is exposed are monitored. After a determination has been made that a characteristic meets or exceeds a threshold, (i) information regarding multiple QoS settings assigned to a volume of the storage node utilized by the client is obtained, (ii) a new value of a burst IOPS setting of the multiple QoS settings is calculated by increasing a current value of the burst IOPS setting by a factor dependent upon a first and a second QoS setting of the multiple QoS settings, and (iii) the new value of the burst IOPS setting is assigned to the volume for the client.

20 Claims, 13 Drawing Sheets

(58) Field of Classification Search
CPC ............ G06F 11/3006; G06F 11/3034; G06F 11/3409; G06F 11/3419; G06F 2001/81; H04L 41/083; H04L 41/0853; H04L 41/0873; H04L 41/0896; H04L 41/5003; H04L 41/5012; H04L 41/5016; H04L 41/5025; H04L 41/5067; H04L 65/80; H04L 67/1012; H04L 67/1097; H04L 67/322
USPC ............ 709/226; 710/74; 711/154; 718/104
See application file for complete search history.

(56) References Cited

U.S. PATENT DOCUMENTS

| | | | |
|---|---|---|---|
| 9,383,269 | B2 | 7/2016 | Hammerschmidt |
| 9,411,834 | B2 | 8/2016 | Hrischuk et al. |
| 9,542,103 | B2 | 1/2017 | Faulkner et al. |
| 9,542,293 | B2 | 1/2017 | Sprague et al. |
| 9,542,346 | B2 | 1/2017 | Hrischuk et al. |
| 9,547,445 | B2 | 1/2017 | Faulkner et al. |
| 9,838,269 | B2 * | 12/2017 | Wright ................ H04L 67/535 |
| 9,930,133 | B2 | 3/2018 | Susarla et al. |
| 9,938,269 | B2 | 4/2018 | Geneste et al. |
| 10,237,201 | B2 | 3/2019 | Kelly |
| 10,254,970 | B1 | 4/2019 | Martin et al. |
| 10,313,251 | B2 | 6/2019 | Kalman et al. |
| 10,419,580 | B2 | 9/2019 | Foulkes et al. |
| 10,509,739 | B1 | 12/2019 | Gudipati et al. |
| 10,516,582 | B2 | 12/2019 | Wright et al. |
| 10,866,768 | B2 | 12/2020 | Breternitz, Jr. et al. |
| 10,951,488 | B2 | 3/2021 | Wright et al. |
| 10,997,098 | B2 | 5/2021 | Longo et al. |
| 11,005,924 | B1 | 5/2021 | Cady et al. |
| 11,140,219 | B1 | 10/2021 | Cady |
| 11,693,563 | B2 | 7/2023 | Longo et al. |
| 2007/0047527 | A1 | 3/2007 | Croak et al. |
| 2007/0064604 | A1 | 3/2007 | Chen et al. |
| 2007/0083482 | A1 | 4/2007 | Rathi et al. |
| 2009/0287898 | A1 | 11/2009 | Hara |
| 2010/0046369 | A1 | 2/2010 | Zhao et al. |
| 2013/0212349 | A1 | 8/2013 | Maruyama |
| 2013/0223216 | A1 | 8/2013 | Greene et al. |
| 2013/0227145 | A1 | 8/2013 | Wright et al. |
| 2013/0232261 | A1 | 9/2013 | Wright et al. |
| 2013/0279326 | A1 | 10/2013 | Dunne et al. |
| 2014/0223014 | A1 | 8/2014 | Bairavasundaram et al. |
| 2014/0344810 | A1 | 11/2014 | Wang |
| 2015/0201017 | A1 | 7/2015 | Hrischuk et al. |
| 2015/0277767 | A1 | 10/2015 | Hamano et al. |
| 2015/0324232 | A1 | 11/2015 | Wang |
| 2016/0197794 | A1 | 7/2016 | Wang et al. |
| 2016/0291892 | A1 * | 10/2016 | Rao ................ G06F 3/0604 |
| 2016/0366223 | A1 * | 12/2016 | Mason ................ G06F 9/5072 |
| 2017/0053011 | A1 | 2/2017 | Alatorre et al. |
| 2017/0132085 | A1 | 5/2017 | Wang et al. |
| 2017/0317895 | A1 | 11/2017 | Wright et al. |
| 2018/0004452 | A1 | 1/2018 | Ganguli et al. |
| 2018/0081832 | A1 | 3/2018 | Longo et al. |
| 2019/0235777 | A1 * | 8/2019 | Wang ................ G06F 3/0619 |
| 2021/0160155 | A1 | 5/2021 | Wright et al. |
| 2021/0314394 | A1 | 10/2021 | Cady et al. |

OTHER PUBLICATIONS

Bigelow S.J., "Definition Microsoft Storage QoS (Storage Quality of Service)," TechTarget Network, 2022, 5 pages. URL: https://www.techtarget.com/searchwindowsserver/definition/Microsoft-Storage-QoS-Storage-Quality-of-Service#:~:text=Microsoft%20Storage%20QoS%20(Storage%20Quality%20of%20Service)%20is%20a%20feature,Cluster%20Shared%20Volumes%20(CSV).

Crump G., "What Is Storage QoS?," Network Computing, 2014, 6 pages. URL: https://www.networkcomputing.com/data-centers/what-storage-qos.

NetApp., "Concept of HCI Performance," NetApp HCI Documentation, 2022, pp. 1, URL: https://docs.netapp.com/us-en/hci/docs/concept_hci_performance.html.

NetApp., "Guarantee throughput with QoS," ONTAP 9, 2022, pp. 1-17. URL: https://docs.netapp.com/us-en/ontap/performance-admin/guarantee-throughput-qos-task.html.

NetApp., "ONTAP 9 Documentation," ONTAP 9, 2022, pp. 1-2905. URL: https://docs.netapp.com/us-en/ontap/index.html.

NetApp., "Storage QoS," Data ONTAP 8.2, 2014, 1 page. URL: https://library.netapp.com/ecmdocs/ECMP1552961/html/GUID-868E65B9-B84D-4191-A69D-17F0E0D8914C.html.

NetApp., "What is Adaptive QoS and how does it work?," 2022, pp. 1-5. URL: https://kb.netapp.com/Advice_and_Troubleshooting/Data_Storage_Software/ONTAP_OS/What_is_Adaptive_QoS_and_how_does_it_work.

Non Final Office Action Mailed Nov. 2, 2022, for U.S. Appl. No. 17/237,488, filed Apr. 22, 2021, 5 pages.

Notice of Allowance mailed on Apr. 17, 2023 for U.S. Appl. No. 17/301,852, filed Apr. 15, 2021, 7 pages.

Notice of Allowance mailed on Aug. 8, 2023 for U.S. Appl. No. 17/449,911, filed Oct. 4, 2021, 05 pages.

Notice of Allowance mailed on May 1, 2023 for U.S. Appl. No. 17/449,911, filed Oct. 4, 2021, 5 pages.

Sammer, "NetApp SolidFire Quality of Service (QOS)", Technical Report, Oct. 2017, 20 pages, NetApp, Inc. URL: https://www.netapp.com/pdf.html?item=/media/10502-tr-4644.pdf.

* cited by examiner

AUTOMATED TUNING OF A QUALITY OF SERVICE SETTING FOR A DISTRIBUTED STORAGE SYSTEM BASED ON INTERNAL MONITORING

CROSS-REFERENCE TO RELATED APPLICATIONS

This application is a continuation of U.S. patent application Ser. No. 17/237,488, filed Apr. 22, 2021, now U.S. Pat. No. 11,693,563, the contents of which are hereby incorporated by reference in their entirety for all purposes.

BACKGROUND

Field

Various embodiments of the present disclosure generally relate to data storage systems. In particular, some embodiments relate to improving efficiency and user experience by monitoring Quality of Service (QoS) settings in a distributed storage system and automatically tuning the QoS settings as may be appropriate to address various issues, including under or over-provisioning and/or other issues that may result in performance degradation.

Description of the Related Art

Multiple storage nodes organized as a cluster (also referred to herein as a distributed storage system) may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume. For example, the metadata may describe, e.g., identify, storage locations on the devices for the data. The data of each volume may be divided into data blocks. The data blocks may be distributed in a content driven manner throughout the nodes of the cluster.

One way of attempting to provide a better user experience is by providing a Quality of Service feature that allows users to set a QoS that guarantees a particular level of performance for volumes. For example, QoS may guarantee a particular level of performance by provisioning minimum, maximum, and/or burst levels of input/output operations per second (IOPS) to volumes.

SUMMARY

Systems and methods are described for automatically tuning QoS settings of volumes in a distributed storage system. According to one embodiment, one or more characteristics of a workload of a client to which a storage node of multiple storage nodes of the distributed storage system is exposed are monitored. After a determination has been made that a characteristic of the one or more characteristics meets or exceeds a predetermined or configurable threshold, (i) information regarding multiple Quality of Service (QoS) settings assigned to a volume of the storage node that is being utilized by the client is obtained, (ii) a new value of a burst input/output operations per second (IOPS) setting of the multiple QoS settings is calculated by increasing a current value of the burst IOPS setting by a factor dependent upon a first QoS setting of the multiple QoS settings and a second QoS setting of the multiple QoS settings, and the new value of the burst IOPS setting is assigned to the volume for the client.

According to another embodiment, a set of volumes of multiple volumes of a distributed storage system that are being utilized by a client is determined in which each volume of the set of volumes satisfies a first QoS setting assigned to the volume and a second QoS setting assigned to the volume. A subset of the set of volumes is determined in which each volume of the subset satisfies an upper bound of a range based on a minimum IOPS setting of the volume. For one or more volumes of the subset, a new value of the first QoS setting that is less than a current value of the first QoS setting is determined and assigned to the respective volume for the client.

According to another embodiment, for each volume of one or more volumes of multiple volumes of a distributed storage system being utilized by a client a first number of observations within a time window in which the volume operates at below a minimum IOPS setting of the volume is determined, a second number of observations within the time window in which the volume operates at a range between the minimum IOPS setting and a maximum IOPS setting of the volume is determined, and a third number of observations within the time window in which the volume exceeds an upper bound of the range and in which the volume exceeds the maximum IOPS setting is determined. A determination is made regarding whether a quotient based on the first, second, and third numbers of observations is greater than a percentage threshold for a given volume. Responsive to determining that the quotient is greater than the percentage, the minimum IOPS setting of the given volume is increased by determining a new value of the minimum IOPS setting for the volume that is greater than a current value of the minimum IOPS setting and assigning the new value of the minimum IOPS setting to the volume for the client.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
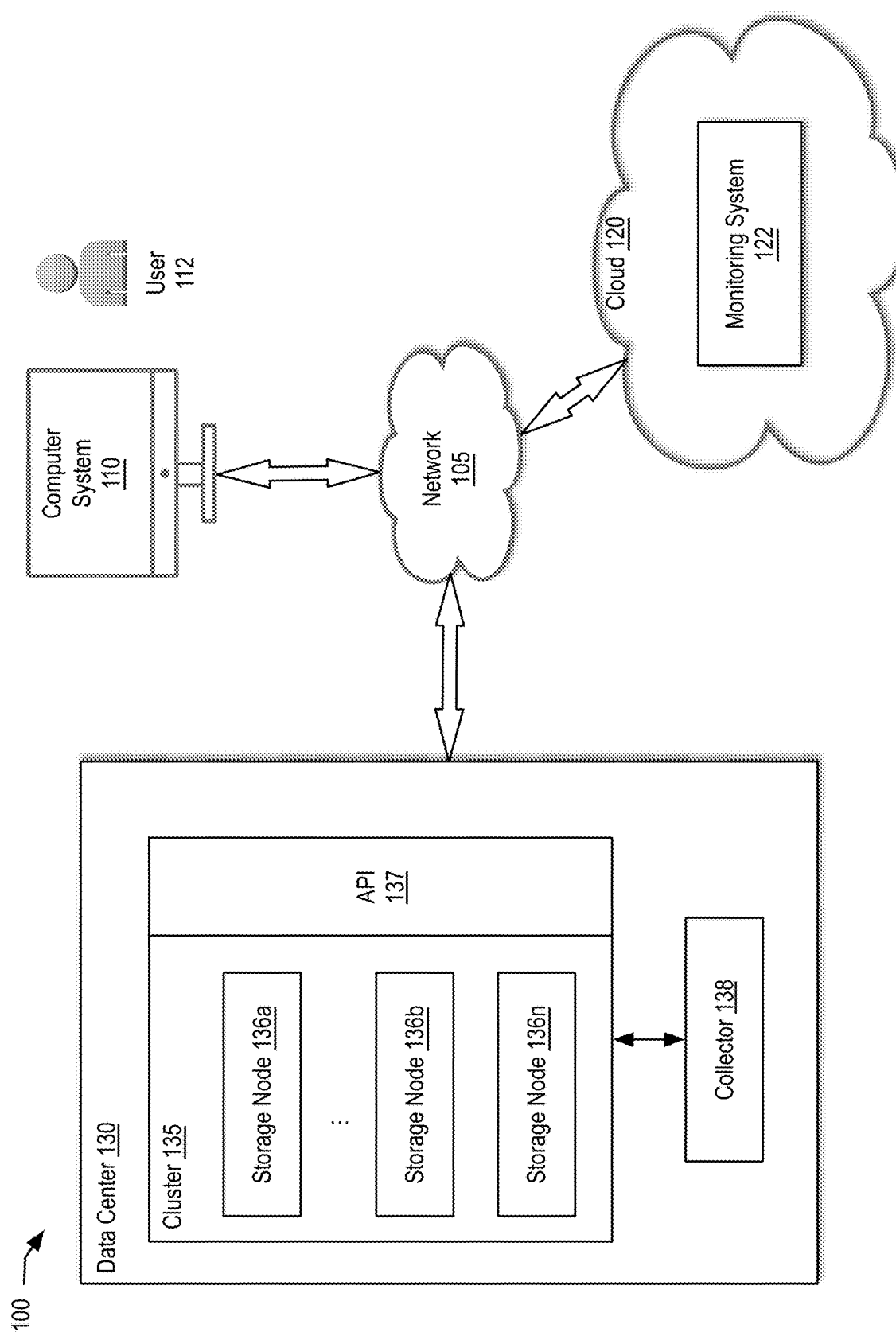
FIG. 1 is a block diagram illustrating an environment in which various embodiments may be implemented.

Systems and methods are described for automatically tuning QoS settings of volumes in a distributed storage system. One way of attempting to provide a better user experience for users of distributed storage systems is by providing a QoS feature that allows users to set a QoS that guarantees a particular level of performance for volumes of the distributed storage system. For example, QoS may guarantee a particular level of performance by provisioning minimum, maximum, and/or burst levels of input/output operations per second (IOPS) to the volumes.

While proper settings for various QoS parameters enhance overall performance of a distributed storage system, provisioning of QoS parameters (e.g., minimum, maximum, and burst levels of IOPS) to volumes is highly dynamic and complex, especially across many volumes of slice services. For example, access to a volume by a client may change frequently. Accordingly, the client may repeatedly need to pay attention and provision IOPS to volumes frequently. Additionally, the level of complexity may be difficult to understand for many clients. Accordingly, clients may consistently misconfigure their QoS settings (e.g., by over-provisioning or under-provisioning their minimum levels of IOPS). For example, if a client disproportionately allocates the minimum IOPS settings, maximum IOPS settings, and/or the burst IOPS settings of a plurality of volumes accessed by the client, load balancing issues may arise if the allocation does not accurately reflect the desired performance. In some examples, the load on the volumes may be unbalanced and the user may detect poor performance from the system due to latency. Such QoS settings may occur because, for example, the client may be inexperienced in assigning QoS settings to volumes, may be inexperienced in knowing or unaware of the workload of volumes, and the like. Such misconfiguration may lead to suboptimal utilization of the QoS feature and may degrade volume and overall slice service performance.

A slice service balancer may balance volumes on slice services across storage nodes based on, for example, the minimum IOPS settings, the maximum IOPS settings, and/or the burst IOPS settings of the volumes. The slice service balancer may inject latency on I/O operations to keep volumes within their allocated QoS domains. Throttle is the pushback on all volumes on a slice service, and the slice service balancer may enforce QoS by throttling one or more volumes. Throttling a volume acts by restricting the number of IOPS that the volume is allowed to perform, for each sample period (e.g., every 500 milliseconds).

In some examples, the minimum IOPS setting of a volume may be set too high or too low for the volume's workloads. For example, if the minimum IOPS setting of a volume is set too high (e.g., the volume rarely processes enough IOPS operations to reach the minimum IOPS setting), then too much I/O may be allocated from other volumes to a volume that does not need it. In this example, it may be desirable to decrease the minimum IOPS setting of the volume. Reference to a workload exceeding a QoS setting (e.g., minimum, maximum, and/or burst IOPS setting) may refer to a volume processing the workload exceeding the QoS setting. In another example, if the minimum IOPS setting of a volume is set too low (e.g., the volume typically processes more IOPS operations than the minimum IOPS setting), then it may be desirable to increase the minimum IOPS setting of the volume to guarantee workloads running on the volume a greater number of IOPS.

In some examples, the maximum IOPS setting of a volume may be set too high or too low for the volume's processing workloads. For example, if the maximum IOPS setting of a volume is set too high (e.g., the volume rarely processes enough IOPS operations to reach the maximum IOPS setting), then too much I/O may be allocated from other volumes to a volume that does not need it. In this example, it may be desirable to decrease the maximum IOPS setting of the volume. In another example, if the maximum IOPS setting of a volume is set too low (e.g., the volume is typically asked to process more IOPS operations than the maximum IOPS setting), then the volume may be throttled along with the volumes on that volume's slice service, resulting in degradation of performance for the entire slice service. In this example, it may be desirable to increase the maximum IOPS setting of the volume.

In some examples, some QoS settings may be set too close together, resulting in performance degradation. For example, if the cluster becomes bound by I/O capacity, the volumes may be scaled back from their maximum IOPS level proportionally toward their minimum IOPS values to ensure fair resource allocation when the system is heavily loaded. If the minimum and maximum IOPS settings are too close (e.g., within a threshold), then the system may be unable to ensure fair resource allocation when it is heavily loaded. In this example, it may be desirable to raise the burst IOPS setting of the volume such that the volume is able to process more IOPS during a spike in demand. In another example, if the maximum and burst IOPS settings are too close, the volume may be unable to effectively process IOPS during a spike in demand. In this example, it also may be desirable to raise the burst IOPS setting of the volume such that the volume is able to process more IOPS during a spike in demand. Accordingly, if a client disproportionately allocates the minimum IOPS settings, maximum IOPS settings, and/or the burst IOPS settings of a plurality of volumes accessed by the client, load balancing issues may arise if the allocation does not accurately reflect the desired performance.

Embodiments described herein seek to improve the technological process of identifying appropriate QoS settings for a distributed storage system. Various embodiments of the present technology provide for a wide range of technical effects, advantages, and/or improvements to computing systems and components. For example, various embodiments may include technical effects, advantages, and/or improvements relating to one or more of (i) tuning of QoS settings so as to achieve enhanced volume and overall slice service performance as well as fair resource allocation among multiple storage nodes of a distributed storage system; (ii) triggering of automated tuning of appropriate QoS settings based on periodic evaluation of various scenarios that are likely to result in degradation of system performance; and (iii) use of non-routine and unconventional computer operations to enhance the monitoring of volume operations and/or use of current QoS settings to facilitate automated tuning of QoS settings for volumes of a distributed storage system.

In the context of various examples described herein, a QoS tuning module is implemented internally to the distributed storage system and is operable to evaluate current QoS settings and automatically tune (e.g., increase or decrease) the QoS settings as appropriate. For example, responsive to identifying a scenario in which degradation of system performance is considered likely to occur, the QoS tuning module may replace a current QoS setting of a volume with a newly determined value for the QoS setting of one or more applicable volumes. By proactively and automatically modifying the QoS settings of volumes, throttling of the volumes may be reduced and accordingly, the distributed storage system and network may run more efficiently and further improve the user's experience. As described further below, various advantages of implementing such automated QoS tuning functionality within the distributed storage system as opposed to externally include the frequency at which various data and/or metrics are available and the availability of additional data and/or metrics that may not be accessible via an Application Programming Interface (API) provided by the distributed storage system.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

Depending upon the particular context, a "client" may be used herein to refer to a physical or virtual machine or a process running thereon. A client process may be responsible for storing, retrieving, and deleting data in the system. A client process may address pieces of data depending on the nature of the storage system and the format of the data stored. For example, the client process may reference data using a client address. The client address may take different forms. For example, in a storage system that uses file storage, the client may reference a particular volume or partition, and a file name. With object storage, the client address may be a unique object name. For block storage, the client address may be a volume or partition, and a block address. Clients may communicate with metadata, corresponding to the slice services and the volume(s) residing on the slice services, using different protocols, such as SCSI, iSCSI, FC, common Internet file system (CIFS), network file system (NFS), HTTP, web-based distributed authoring and versioning (WebDAV), or a custom protocol. Each client may be associated with a volume. In some examples, only one client accesses data in a volume. In some examples, multiple clients may access data in a single volume.

As used herein, "telemetry data" generally refers to performance, configuration, load, and other system data of a monitored system. Telemetry data may refer to one data point or a range of data points. Non-limiting examples of telemetry data for a distributed storage system include latency, utilization, a number of input output operations per second (IOPS), a slice service (SS) load, Quality of Service (QoS) settings, or any other performance related information.

As used herein, "slice service load" or "SS load" generally refer to a measure of volume load per storage node of a distributed storage system. As described further below, IO operations may be throttled by the storage operating system of the distributed storage system depending upon and responsive to observation of the SS load exceeding various predefined or configurable thresholds. In one embodiment, SS load is a measure of cache (e.g., primary cache and secondary cache) capacity utilization in bytes (e.g., percent full of 8 gigabytes (GB) in the primary cache and a relatively large number of GB in the secondary cache). Depending upon the particular implementation, the SS load may be the maximum between the fullness of the primary cache and the secondary cache (e.g., a maximum among all services hosting a given volume). According to one embodiment, these two metrics, along with perceived latency, may be the inputs into the SS load calculation. For example, SS load may be the maximum value between primary cache fullness, secondary cache fullness, and latency.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g. user 112) of a distributed storage system (e.g., cluster 135) or a managed service provider responsible for multiple distributed storage systems of the same or multiple customers may monitor various telemetry data of the distributed storage system or multiple distributed storage systems via a browser-based interface presented on a client (e.g., computer system 110).

In the context of the present example, the environment 100 is shown including a data center 130, a cloud 120, computer system 110, and a user 112. The data center 130, the cloud 120, and the computer systems 110 may be coupled in communication via a network 105, which, depending upon the particular implementation, may be a Local Area Network (LAN), a Wide Area Network (WAN), or the Internet.

The data center 130 may represent an enterprise data center (e.g., an on-premises customer data center) that is build, owned, and operated by a company or the given data center may be managed by a third party (or a managed service provider) on behalf of the company, which may lease the equipment and infrastructure. Alternatively, the data center 130 may represent a colocation data center in which a company rents space of a facility owned by others and located off the company premises. Data center 130 is shown including a distributed storage system (e.g., cluster 135) and a collector 138. Those of ordinary skill in the art will appreciate additional IT infrastructure may be part of the data center 130; however, discussion of such additional IT infrastructure is unnecessary to the understanding of the various embodiments described herein.

Turning now to the cluster 135, it includes multiple storage nodes 136a-n and an API 137. In the context of the present example, the multiple storage nodes 136a-n are organized as a cluster and provide a distributed storage architecture to service storage requests issued by one or more clients (e.g., computer system 110) of the cluster. The data served by the storage nodes 136a-n may be distributed across multiple storage units embodied as persistent storage devices, including but not limited to hard disk drives, solid state drives, flash memory systems, or other storage devices. A non-limiting example of a storage node 136 is described in further detail below with reference to FIG. 2.

The API 137 may provide an interface through which the cluster 135 is configured and/or queried by external actors (e.g., the collector 138, clients, and a cloud-based, centralized monitoring system (e.g., monitoring system 122). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration and other system data) relating to the cluster 135 or components thereof. In one embodiment, API calls may be used to obtain information regarding a custom, proprietary, or standardized measure of the overall load or overall performance (e.g., IOPS) of a particular storage node 136 or to obtain information regarding the overall load or performance of multiple storage nodes 136. As those skilled in the art will appreciate various other types of telemetry data, including, but not limited to measures of latency, utilization, load, and/or performance at various levels (e.g., the cluster level, the storage node level, or the storage node component level), may be made available via the API 137 and/or used internally by various monitoring modules.

The collector 138 may be implemented locally within the same data center in which the cluster 135 resides and may periodically poll for telemetry data of the cluster 135 via the API 137. Depending upon the particular implementation, the polling may be performed at a predetermined or configurable interval (e.g., 60 seconds). The collector 138 may locally process and/or aggregate the collected telemetry data over a period of time by data point values and/or by ranges of data point values and provide frequency information regarding the aggregated telemetry data retrieved from the cluster 135 to the centralized monitoring system for local use or analysis by the user 112.

In the context of the present example, the cloud 120, which may represent a private or public cloud accessible (e.g., via a web portal) to an administrator (e.g., user 112) associated with a managed service provider, includes the monitoring system 122 that may be used to facilitate evaluation and/or selection of new QoS settings. Notably, however, the information available to the monitoring system 122 and the administrator may not be accessible at a sufficient rate to observe high-frequency fluctuations of values of data and/or metrics during a particular time window and that might inform decisions relating to making adjustments to QoS settings. Furthermore, there may be additional data and/or metrics (e.g., a measure of system load (e.g., SS load), a target IOPS, etc.)) that would be helpful to such decision-making may not be accessible via the API 137. Hence, various embodiments described herein involve the use of a QoS tuning module (not shown) implemented internally to the cluster 135 and that is operable to evaluate current QoS settings and automatically tune the QoS settings as appropriate. The QoS tuning module is described further below with reference to FIG. 2.

Systems Metrics and Load of a Distributed Storage System

A distributed storage system (e.g., cluster 135) may include a performance manager or other system metric monitoring and evaluation functionality that can monitor clients' use of the distributed storage system's resources. In addition, the performance manager and/or a QoS system (e.g., a QoS module) may be involved in the regulation of a client's use of the distributed storage system. The client's use of the distributed storage system can be adjusted based upon one or more of system metrics, the client's QoS settings, and the load of the distributed storage system. System metrics may be various measurable attributes of the distributed storage system that may represent directly or be used to calculate a load of the distributed storage system, which, as described in greater detail below, can be used to throttle clients of the distributed storage system.

System metrics are metrics that reflect the use of the system or components of the distributed storage system by all clients. System metrics can include metrics associated with the entire distributed storage system or with components within the distributed storage system. For example, system metrics can be calculated at the system level, cluster level, node level, service level, or drive level. Space utilization is one example of a system metric. The cluster space utilization reflects how much space is available for a particular cluster, while the drive space utilization metric reflects how much space is available for a particular drive. Space utilization metrics can also be determined at the system level, service level, and the node level. Other examples of system metrics include measured or aggregated metrics such as read latency, write latency, IOPS, read IOPS, write IOPS, I/O size, write cache capacity, dedupe-ability, compressibility, total bandwidth, read bandwidth, write bandwidth, read/write ratio, workload type, data content, data type, etc.

IOPS can be real input/output operations per second that are measured for a cluster or drive. Bandwidth may be the amount of data that is being transferred between clients and the volume of data. Read latency may represent the time taken for the distributed storage system to read data from a volume and return the data to a client. Write latency may represent the time taken for the distributed storage system to write data and return a success indicator to the client. Workload type can indicate if IO access is sequential or random. The data type can identify the type of data being accessed/written, e.g., text, video, images, audio, etc. The write cache capacity may refer to a write cache or a node, a block server, or a volume server. The write cache may be implemented in the form of a relatively fast memory that is used to store data before it is written to storage. As noted above, each of these metrics can be independently calculated for the system, a cluster, a node, etc. In addition, these values can also be calculated at a client level.

IOPS may be calculated based on latency and the number of concurrent outstanding read and/or write operations that may be queued (QueueDepth) by the distributed storage system as follows:

IOPS=QueueDepth/Latency

Bandwidth may be calculated based on QueueDepth, latency and I/O size as follows:

Bandwidth=(QueueDepth*IOSize)/Latency where, IOSize is the average I/O size over a period of time (typically, falling between 4 KB to 32 KB, inclusive).

System metrics may be calculated over a period of time, e.g., 250 milliseconds (ms), 500 ms, 1 second (s), etc. Accordingly, different values such as a min, max, standard deviation, average, etc., can be calculated for each system metric. One or more of the metrics may directly represent and/or be used to calculate a value that represents a load of the distributed storage system. Loads can be calculated for the distributed storage system as a whole, for individual components, for individual services, and/or individual clients. System load values may then be used by the QoS system to determine whether and how clients are to be throttled.

In some embodiments, performance for individual clients may be adjusted based upon the monitored system metrics. For example, based on a number of factors (e.g., system metrics and client QoS settings), a number of IOPS that can be performed by a particular client over a period of time may be managed. In one implementation, the performance manager and/or the QoS system regulate the number of IOPS that are performed by locking a client out of a volume for different amounts of time to manage how many IOPS can be performed by the client. For example, when the client is heavily restricted, the client may be locked out of accessing a volume for 450 ms of every 500 ms and when the client is not heavily restricted, the client may be blocked out of a volume for 50 ms of every 500 ms. As such, in this example, the lockout effectively manages the number of IOPS that the client may perform every 500 ms. Although examples using IOPS are described, other metrics may also be used, as will be described in more detail below.

Client Quality of Service (QoS) Parameter Settings

In addition to system metrics, client quality of service (QoS) parameters can be used to affect how a client uses the distributed storage system. Unlike metrics, client QoS parameters are not measured values, but rather represent variables than can be set to define the desired QoS bounds for a client. Client QoS parameters can be set by an administrator or a client. In one implementation, client QoS parameters include minimum, maximum, and max burst values. Using IOPS as an example, a minimum IOPS value is a proportional amount of performance of a cluster for a client. Thus, the minimum IOPS is not a guarantee that the volume will always perform at this minimum IOPS value.

When a volume is in an overload situation, the minimum IOPS value is the minimum number of IOPS that the distributed storage system attempts to provide the client. However, based upon cluster performance, an individual client's IOPS may be lower or higher than the minimum value during an overload situation. In one implementation, the distributed storage system can be provisioned such that the sum of the minimum IOPS across all clients can be sustained for all clients at a given time. In this situation, each client should be able to perform at or above its minimum IOPS value. The distributed storage system, however, can also be provisioned such that the sum of the minimum IOPS across all clients cannot be sustained for all clients. In this case, if the distributed storage system becomes overloaded through the use of all clients, the client's realized IOPS can be less than the client's minimum IOPS value. In failure situations, the distributed storage system may also throttle users such that their realized IOPS are less than their minimum IOPS value.

A maximum IOPS parameter is the maximum sustained IOPS value over an extended period of time. The burst IOPS parameter is the maximum IOPS value that a client can "burst" above the maximum IOPS parameter for a short period of time based upon credits. In one implementation, credits for a client are accrued when a given client is operating under its respective maximum IOPS parameter. Accordingly, clients may be limited to use of the distributed storage system in accordance with their respective maximum IOPS and burst IOPS parameters. For example, a given client may not be able to use the distributed storage system's full resources, even if they are available, but rather, may be bounded by the respective maximum IOPS and burst IOPS parameters of the given client. In some embodiments, client QoS parameters can be changed at any time by the client, an administrator, and/or by automated means (e.g., by one of the various automated tuning approaches described herein). Non-limiting examples of various automated tuning approaches for QoS settings that may be performed by an internally implemented QoS tuning module are described below with reference to FIGS. 3-11.

Example Storage Node

Figure 2:
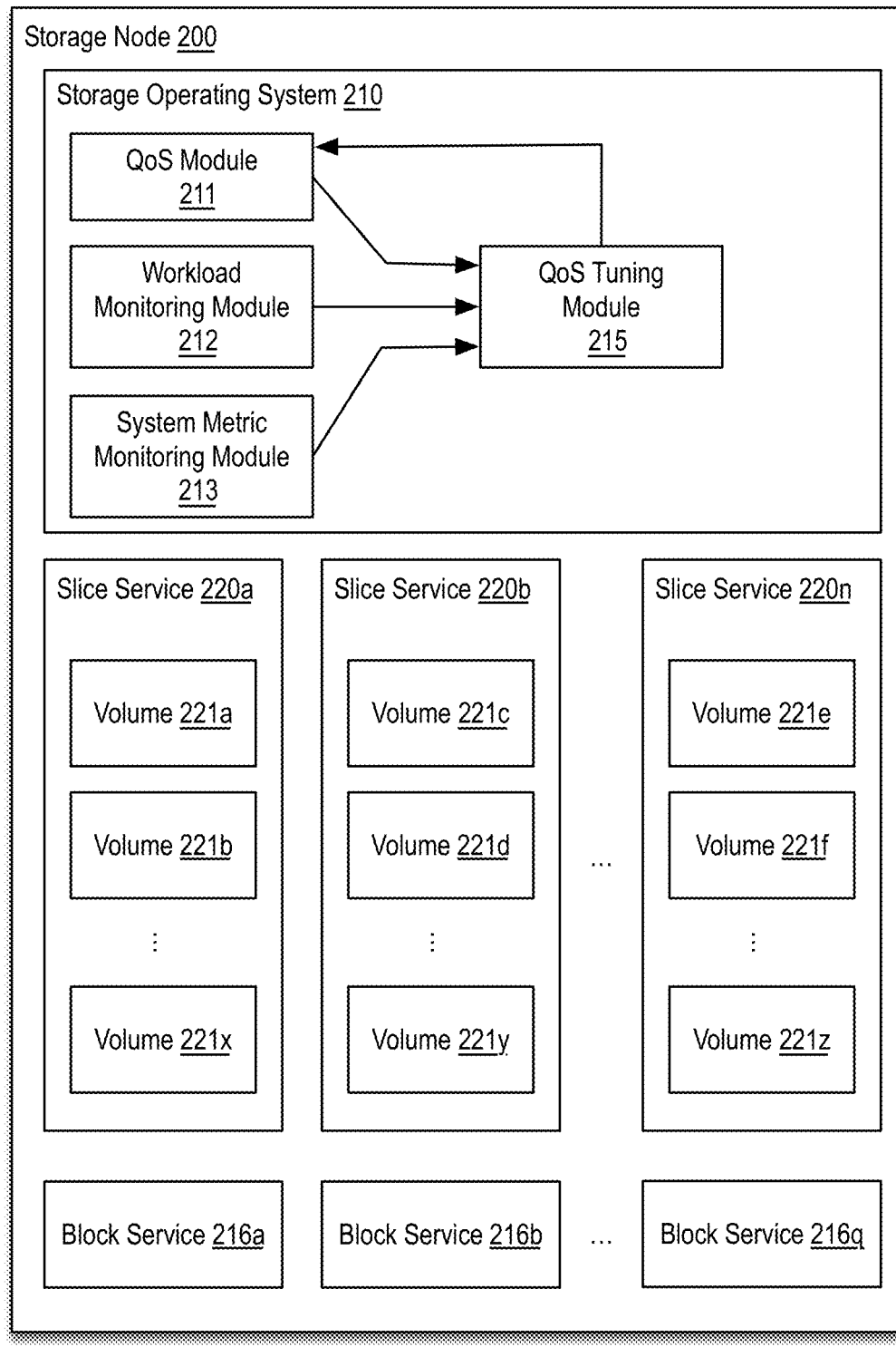
FIG. 2 is a block diagram illustrating a storage node in accordance with an embodiment of the present disclosure.

FIG. 2 is a block diagram illustrating a storage node 200 in accordance with an embodiment of the present disclosure.

Storage node 200 represents a non-limiting example of storage nodes 136a-n. In the context of the present example, storage node 200 may include a storage operating system (OS) 210, one or more slice services 220a-n, and one or more block services 216a-q. The storage OS 210 may provide access to data stored by the storage node 200 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 210 is NetApp Element Software (e.g., the SolidFire Element OS) based on Linux and designed for SSDs and scale-out architecture with the ability to expand up to 100 storage nodes. In the context of the present example, the storage OS 210 also includes a QoS module 211, a workload monitoring module 212, a system metric monitoring module 213, and a QoS tuning module 215. According to one embodiment, the QoS tuning module 215 is implemented on the storage node representing the cluster master. The QoS tuning module 215 may be responsible for periodically evaluating the QoS parameters values and metrics monitored and collected by the QoS module 211, the workload monitoring module 212, and the system metric monitoring module 213, evaluating the QoS parameters values and metrics as described further below and automatically tuning the QoS parameters.

The QoS module 211 may be responsible for applying one or more QoS settings (e.g., maximum, minimum, and burst IOPS) to one or more volumes (e.g., volumes 221a-x, volumes 221c-y, and volumes 221e-z) for a particular client (not shown). While various examples herein may be described with reference to a minimum IOPS, a maximum IOPS, and a burst IOPS as an example set of QoS settings, it is to be appreciated the various approaches for automated tuning of QoS settings described herein are equally applicable to various other individual QoS settings and to sets of one or more QoS settings, including, but not limited to a read latency parameter, a write latency parameter, a total IOPS parameter, a read IOPS parameter, a write IOPS parameter, an I/O size parameter, a total bandwidth parameter, a read bandwidth parameter, a write bandwidth parameter, and a read/write IOPS ratio parameter. While in the context of the present example, a single instance of the QoS module 211 is shown within the storage OS 210, an instance of the QoS module 211 may alternatively be implemented within each of the slice services 220a-n.

The workload monitoring module 212 may be responsible for monitoring and evaluating information (e.g., IOPS) indicative of a workload to which the storage node 200 is exposed. While various examples described herein may be described in the context of a total number of IOPS, it is to be appreciated the various approaches for automated tuning of QoS settings described herein are equally applicable to other individual characteristics of a workload or sets of one or more workload characteristics, including, but not limited to a number of read IOPS, a number of write IOPS, a proportion of read IOPS to write IOPS, an I/O size, and a statistical measure of any of the foregoing over a period of time.

The system metric monitoring module 213 may be responsible for monitoring and calculating a measure of load on the cluster as a whole and/or at various levels or layers of the cluster or the storage node 200. For example, metrics may be available for individual or groups of storage nodes (e.g., storage nodes 136a-n), individual or groups of volumes 221, individual or groups of slice services 220, and/or individual or groups of block services 216. In some embodiments, IOPs may be throttled by the storage OS 210 depending upon and responsive to one or more system metrics (e.g., SS load) exceeding various predefined or configurable thresholds. A graph illustrating an example of IOPS push back is described below with reference to FIG. 13.

While in the context of the present example, the QoS module 211, the workload monitoring module 212, and the system metric monitoring module 213 are depicted as directly interacting with the QoS tuning module 215 and the QoS tuning module 215 is depicted as directly interacting with the QoS module 211, it is to be appreciated that the QoS tuning module may receive information from such modules indirectly and/or convey new values to be applied by QoS module 211 indirectly via a shared location (e.g., a centralized service operable to maintain such configuration information in a distributed environment). For example, the QoS module 211, the workload monitoring module 212, and the system metric monitoring module 213 may periodically monitor and collect QoS settings, workload characteristics, and system metrics every 500 ms and persist such data to ZooKeeper for use by the QoS tuning module 215. Similarly, for its part, the QoS tuning module 215 may periodically (e.g., every 15 minutes) or responsive to a predefined or configurable event (e.g., a system metric and/or a workload characteristic crossing a particular threshold) inspect the data/metrics for each volume (e.g., volume 221) in the cluster and make decisions as described below regarding whether and how to adjust the volume's QoS settings and apply the new values to the centralized service to facilitate such new values being acted upon accordingly by the QoS modules throughout the cluster.

While various examples described herein may be described with reference to the use of SS load as an example system load metric, it is to be appreciated the various approaches for automated tuning of QoS settings described herein are equally applicable to various other individual system metrics and to sets of one or more system metrics, including, but not limited to a read latency metric, a write latency metric, an IOPS metric, a read IOPS metric, a write IOPS metric, a total bandwidth metric, a read bandwidth metric, a write bandwidth metric, a read/write IOPS ratio metric, a read/write latency metric, and a read/write bandwidth ratio metric.

Turning now to the slice services 220a-n, each slice service 220 may include one or more volumes (e.g., volumes 221a-x, volumes 221c-y, and volumes 221e-z). Client systems (not shown) associated with an enterprise may store data to one or more volumes, retrieve data from one or more volumes, and/or modify data stored on one or more volumes. In one embodiment, the storage node 200 also includes a primary cache and a secondary cache logically associated with the slice services 220a-n. The primary cache may represent the first place data associated with IO operations is temporarily buffered and may be implemented in the form of dynamic random access memory (DRAM) backed by a battery and non-volatile memory (e.g., NAND flash) to make it persistent. The secondary cache may represent a secondary location for temporarily storing data during rainy-day scenarios. In one embodiment, the secondary cache may be implemented within a small portion of the solid-state drives (SSDs) of the storage node 200.

The slice services 220a-n and/or the client system may break data into data blocks. Block services 216a-q and slice services 220a-n may maintain mappings between an address of the client system and the eventual physical location of the data block in respective storage media of the storage node 200. In one embodiment, volumes 221 include unique and uniformly random identifiers to facilitate even distribution of a volume's data throughout a cluster (e.g., cluster 135). The slice services 220a-n may store metadata that maps between client systems and block services 216. For example, slice services 220 may map between the client addressing used by the client systems (e.g., file names, object names, block numbers, etc. such as Logical Block Addresses (LBAs)) and block layer addressing (e.g., block identifiers) used in block services 216. Further, block services 216 may map between the block layer addressing (e.g., block identifiers) and the physical location of the data block on one or more storage devices. The blocks may be organized within bins maintained by the block services 216 for storage on physical storage devices (e.g., SSDs).

A bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 216a-q and associated storage device (e.g., SSD). A sublist identifier may identify a sublist with the bin, which may be used to facilitate network transfer (or syncing) of data among block services in the event of a failure or crash of the storage node 200. Accordingly, a client can access data using a client address, which is eventually translated into the corresponding unique identifiers that reference the client's data at the storage node 200.

For each volume 221 hosted by a slice service 220, a list of block identifiers may be stored with one block identifier for each logical block on the volume. Each volume may be replicated between one or more slice services 220 and/or storage nodes 200, and the slice services for each volume may be synchronized between each of the slice services hosting that volume. Accordingly, failover protection may be provided in case a slice service 220 fails, such that access to each volume may continue during the failure condition.

The above structure allows storing of data evenly across the cluster of storage devices (e.g., SSDs), which allows for performance metrics to be used to manage load in the cluster. For example, if the cluster is under a load meeting or exceeding a particular threshold, clients can be throttled or locked out of a volume by, for example, the storage OS 210 reducing the amount of read or write data that is being processed by the storage node 200.

IOPS Pushback

Figure 13:
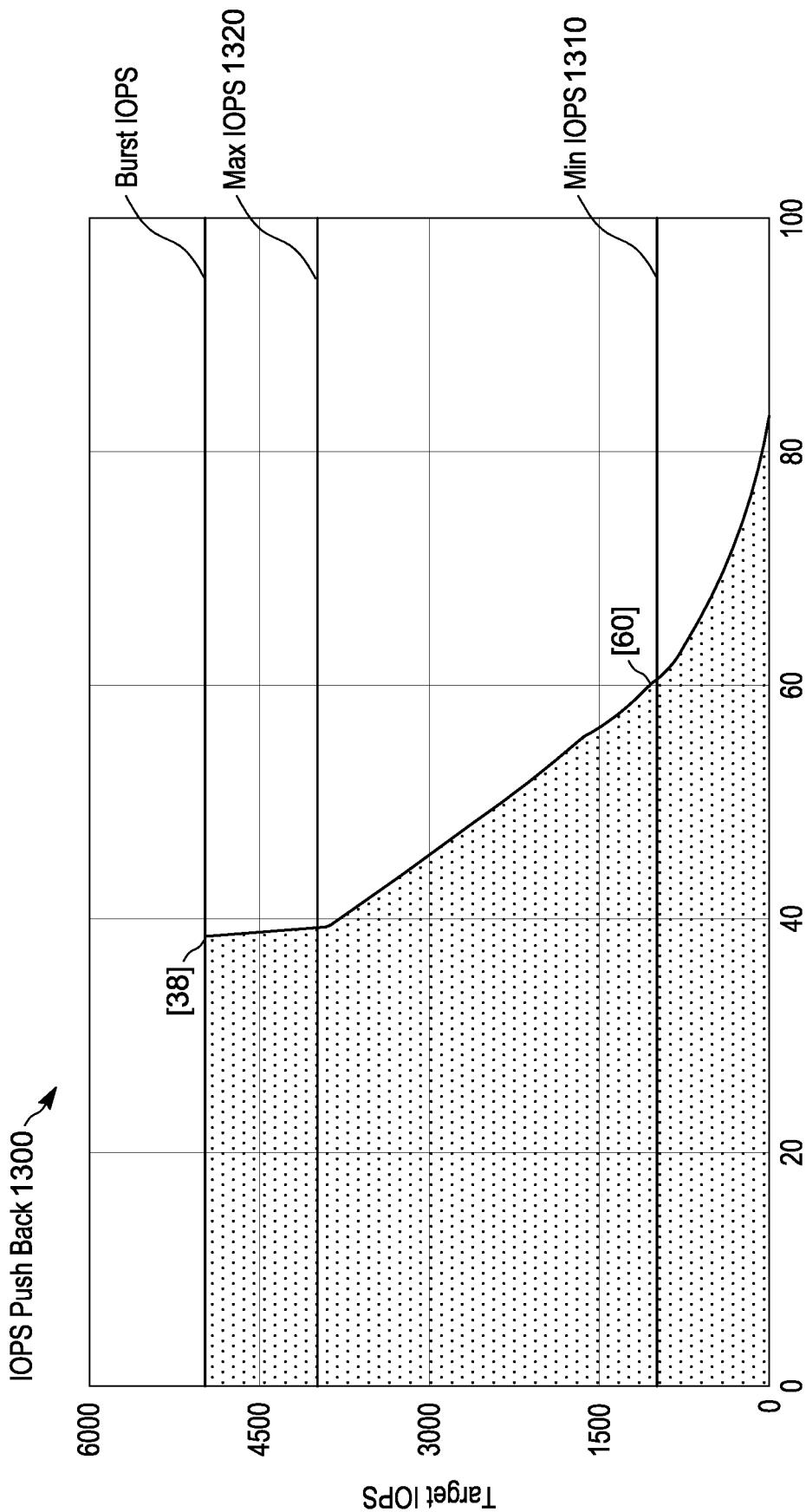
FIG. 13 is a graph illustrating IOPS push back in accordance with an embodiment of the present disclosure.

FIG. 13 is a graph illustrating IOPS push back 1300 in accordance with an embodiment of the present disclosure. In one embodiment, the IOPS pushback 1300 is performed according to an SS Load calculation determined by a system metric monitoring module (e.g., system metric monitoring module 213) for a given slice service (e.g., slice service 220a). In various embodiments, SS load generally represents a value indicative of a load on the given slice service on a scale of 0-100. Depending upon the particular implementation, SS load may be employed in various of the calculations described herein to determine whether the volumes on a given storage node have the performance capacity to do more than they currently are, without overloading the given node.

As shown in the present example, when the SS Load value is within a first range (e.g., between 0 and 37, inclusive), the storage OS (e.g., storage OS 210) does not throttle the volumes residing on the particular slice service. When the SS Load value is within a second range (e.g., between 38-59, inclusive), the storage OS may throttle multiple volumes (e.g., all of volumes 212a-212x) residing on the particular slice service linearly from the maximum IOPS value 1320 (e.g., 4,000 IOPS) to the minimum IOPS value 1310 (e.g., 1,000 IOPS) based on the client QoS settings. If, instead, the SS Load value is within a third range (e.g., between 60-100, inclusive), the storage OS may throttle multiple volumes (e.g., all volumes 212a-212x) residing on the particular slice service using an inverse exponential function towards 0. Accordingly, if the user misconfigures the client QoS settings for the volumes, a slice service may be unnecessarily slow when responding to client requests. It should be understood that the above ranges are provided as examples and may vary in other examples.

Examples of Automated Tuning of QoS Settings

Figure 3:
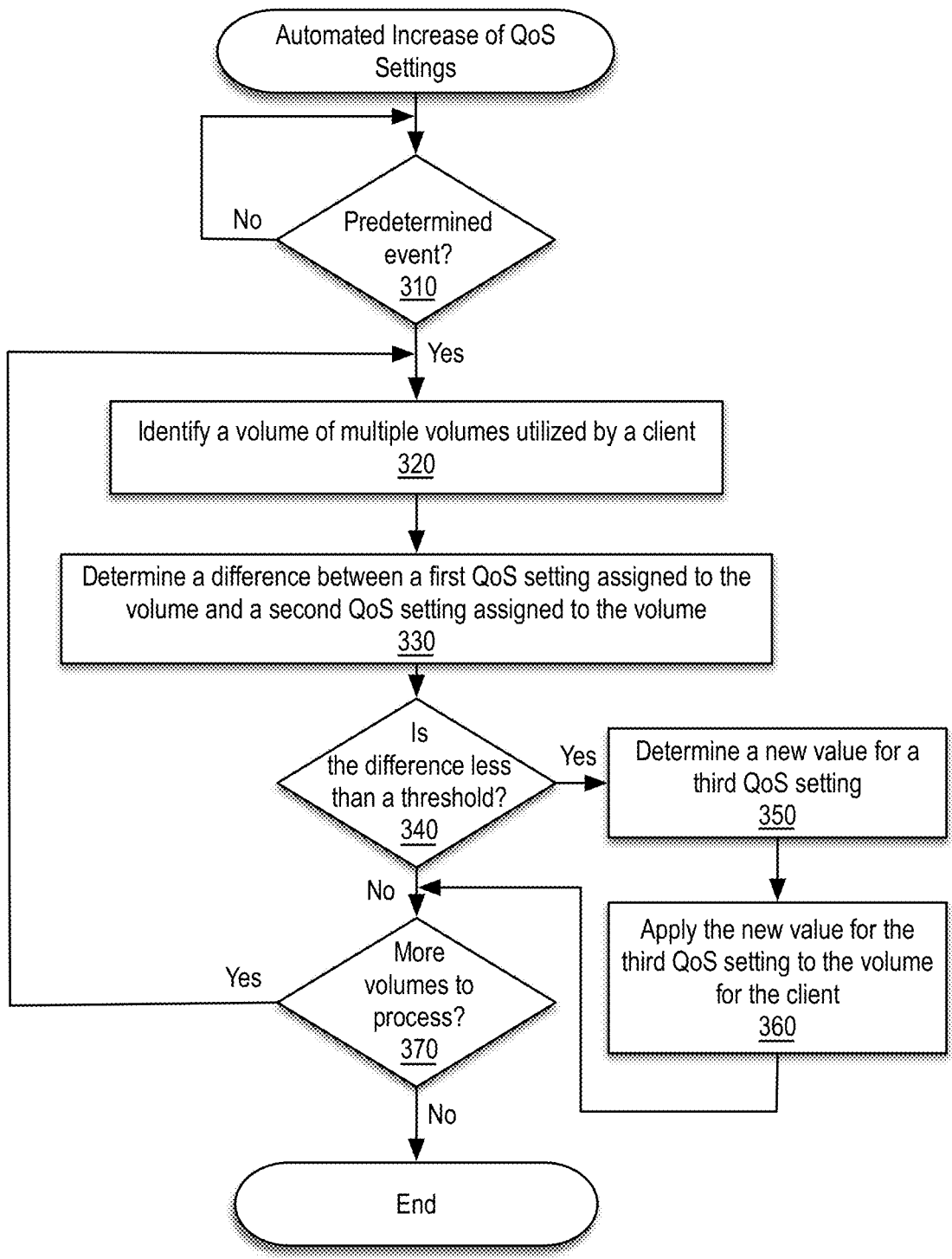
FIG. 3 is a flow diagram illustrating a set of operations for automatically increasing QoS settings in accordance with an embodiment of the present disclosure.

FIG. 3 is a flow diagram illustrating a set of operations for automatically increasing QoS settings in accordance with an embodiment of the present disclosure. The various blocks of the flow diagrams of FIGS. 3-11 may be executed by a computing device (e.g., a processor, processing circuit, and/or other suitable component, for example, of a storage node (e.g., storage node 200)). In the context of various examples, the automatic tuning (e.g., increasing or decreasing) of QoS settings is described with reference to a QoS tuning module (e.g., QoS tuning module 215) implemented within a storage node representing a cluster master.

At decision block 310, it is determined whether a predetermined event has occurred. If so, processing continues with block 320; otherwise, processing loops back to decision block 310. In the context of the present example, the predetermined event represents any of a number of triggering events the occurrence of which may be used to cause QoS settings to be evaluated. Depending upon the particular implementation, the predetermined event may represent one or a combination of expiration of a timer (e.g., X minutes, Y hours, or Z days), a system metric crossing a threshold, a workload characteristic crossing a threshold, or a request by a client.

At block 320, a volume of multiple volumes utilized by a client is identified. For example, via a command line interface (CLI), an administrator-level command (e.g., nfs connected-clients show-node <nodename>) may be used to obtain information regarding which clients are attached to which volumes for a particular storage node.

At block 330, a difference between a first QoS setting assigned to the volume and a second QoS setting assigned to the volume is determined. For each volume used by the client, the client may set the first and/or second QoS settings of the respective volume. At a later point in time, the client may change the first and/or second QoS settings of the volume.

At decision block 340, a determination is made regarding whether the difference is less than a threshold. If so, then processing branches to block 350; otherwise, processing continues with decision block 370. In an example, the threshold is fifty IOPS (as just one non-limiting example of a numeric value), and it is determined whether the difference between the first and second QoS settings is less than the threshold of fifty IOPS. The larger the difference, the larger the range between the first and second QoS settings. The smaller the difference, the smaller the range between the first and second QoS settings.

At block 350, a new value for a third QoS setting is determined that is greater than the current value of the third QoS setting. For purposes of generality, it is noted the third QoS setting may be the same as or different from the first and/or second QoS setting. Depending upon the particular implementation, the current value of the third QoS setting may be increased by a constant factor or by a dynamic factor dependent upon the range between the first and second QoS settings. For example, the size of the dynamic factor may be directly related to the size of the range, thereby increasing the current value of the third QoS setting more when the first and second QoS settings are further apart than when they are closer apart. For example, assuming a minimum IOPS parameter (minIOPS) value of 50, a maximum IOPS parameter (maxIOPS) value of 15000, and a burst IOPS parameter (burstIOPS) value of 15000, burstIOPS may be increased by a percentage (e.g., 10%) of the range between minIOPS and maxIOPS. In some examples, the percentage may be configurable to allow an administrative user of the distributed storage system to make the auto-adjustments more or less aggressive. In one embodiment, the QoS tuning module may restore a default setting for the third QoS setting of the volume if the default is higher than the current setting for the third QoS setting.

At block 360, the new value of the third QoS setting is applied to the volume for the client. For example, the QoS tuning module 215 may store the new value to a centralized service so as to facilitate access to the new value and application of the new value of the third QoS setting to the volume for the client by a QoS module (e.g., QoS module 211) of the storage node of the cluster (e.g., cluster 135) running a slice service 220 including the volume at issue.

At decision block 370, a determination is made regarding whether another volume is to be processed. If so, processing loops back to block 320 where another volume utilized by the client is identified; otherwise, processing for the volumes utilized by the client is complete. According to one embodiment, all volumes or a subset of all volumes for a client may be processed.

In one embodiment, the first QoS setting may represent the maximum IOPS setting of the volume, the second QoS setting may represent the minimum IOPS setting of the volume, and the third QoS setting may represent the burst IOPS setting. For example, it may be desirable to increase a value of the burst IOPS setting of the volume to allow the volume to perform beyond its regular maximum IOPS setting for a longer period of time than would have otherwise been allowed with a non-adjusted burst IOPS setting. A non-limiting example of the specific application of the generalized approach of FIG. 3 with respect to increasing the burst IOPS setting for a particular volume based on the current maximum IOPS and the current minimum IOPS settings of the particular volume is described further below with reference to FIG. 5.

In one embodiment, the first QoS setting may represent the burst IOPS setting of the volume, the second QoS setting may represent the maximum IOPS setting of the volume, and the third QoS setting may represent the burst IOPS setting. For example, it may be desirable to increase a value of the burst IOPS setting of the volume to allow the volume to perform beyond its regular maximum IOPS setting for a longer period of time than would have otherwise been allowed with a non-adjusted burst IOPS setting. A non-limiting example of the specific application of the generalized approach of FIG. 3 with respect to increasing the burst IOPS setting for a particular volume based on the current burst IOPS and the current maximum IOPS settings for the particular volume is described further below with reference to FIG. 6.

The QoS tuning module may execute the various processed described herein with reference to FIGS. 3-11 based on various mechanisms. For example, the QoS tuning module may perform the respective processes periodically (e.g., every 15 minutes), based on a client request, based on detecting a potential performance degradation in the cluster, based on detecting that the client has created X volumes, and/or based on detecting that the client has deleted Y volumes, where X and Y are numbers greater than zero. Additionally, the QoS tuning module may execute the respective processed for one or more clients. It is to be noted the various automated QoS settings tuning approaches described herein with reference to FIGS. 3-11 should not be considered mutually exclusive. As such, the QoS tuning module may The QoS tuning module may execute any or all of such approaches, after, during, or independent of each other based on one or more of the various triggering mechanisms described herein.

While in the context of the present example and in the context of subsequent flow diagrams, a number of enumerated blocks are included, it is to be understood that embodiments may include additional blocks before, after, and/or in between the enumerated blocks. Similarly, in some embodiments, one or more of the enumerated blocks may be omitted or performed in a different order.

Figure 4:
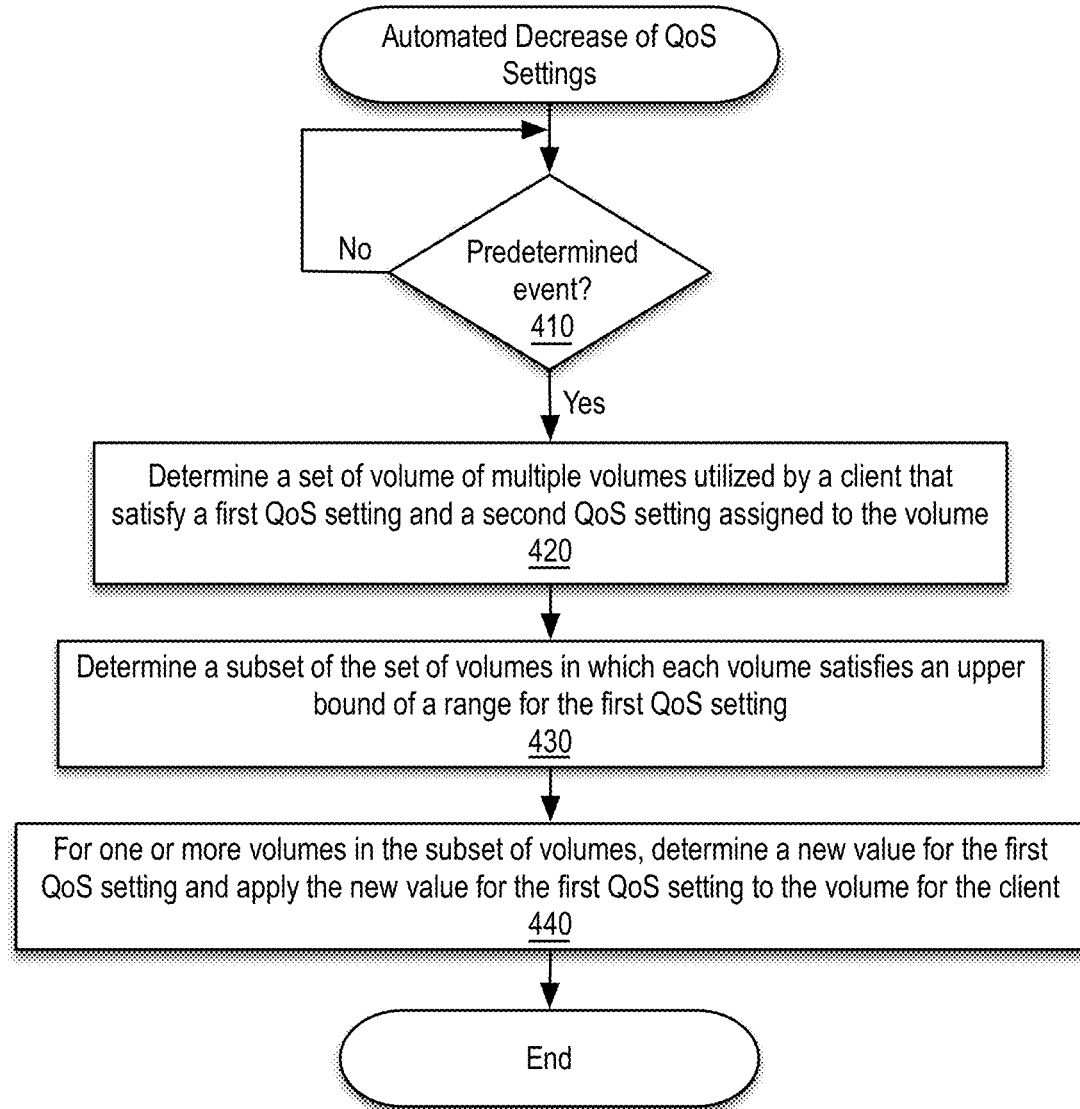
FIG. 4 is a flow diagram illustrating a set of operations for automatically decreasing QoS settings of a volume in accordance with an embodiment of the present disclosure.

FIG. 4 is a flow diagram illustrating a set of operations for automatically decreasing QoS settings of a volume in accordance with an embodiment of the present disclosure. At decision block 410, it is determined whether a predetermined event has occurred. If so, processing continues with block 420; otherwise, processing loops back to decision block 410. Depending upon the particular implementation, the predetermined event may represent expiration of a timer (e.g., X minutes, Y hours, or Z days), a system metric crossing a threshold, a workload characteristic crossing a threshold, or a request by a client.

At block 420, a set of volume of multiple volumes utilized by a client is determined in which each volume satisfies a first QoS setting and a second QoS setting assigned to the volume.

At block 430, a subset of the set of volumes is determined in which each volume of the subset satisfies an upper bound of a range for the first QoS setting of the volume.

At block 440, for one or more volumes of the subset of volumes, a new value is determined for the first QoS setting and the new value for the first QoS setting is applied to the volume for the client. Depending upon the particular implementation, the current value of the first QoS setting may be decreased by a constant factor or by a dynamic factor dependent upon the difference between the first QoS setting and the upper bound. For example, the size of the dynamic factor may be inversely related to the size of the range, thereby decreasing the current value of the first QoS setting more when the first QoS setting is further from the upper bound than when they are closer together. As noted above, in some examples, the constant or dynamic factor may be configurable to allow an administrative user of the distributed storage system to make the auto-adjustments more or less aggressive. In one embodiment, the QoS tuning module may restore a default setting for the first QoS setting of the volume if the default is lower than the current value of the first QoS setting.

In one embodiment, the first QoS setting may represent the minimum IOPS setting of the volume, and the second QoS setting may represent the maximum IOPS setting of the volume. For example, in relation to block 420, a volume may satisfy the first QoS setting and the second QoS setting when the volume has not exceeded the minimum IOPS setting of the volume within a time window and has not exceeded the maximum IOPS setting of the volume within the time window. In relation to block 430, a volume of the subset may satisfy an upper bound of a range based on the minimum IOPS setting when the volume does not exceed the upper bound of a range between zero and the minimum IOPS setting during the time window. For example, a subset of the volumes may be determined, where each volume of the subset does not exceed an upper bound of a below-minimum during the time window. A non-limiting example of the specific application of the generalized approach of FIG. 4 with respect to decreasing the minimum IOPS setting for a particular volume is described further below with reference to FIG. 7.

In one embodiment, the first QoS setting may represent the maximum IOPS setting of the volume, and the second QoS setting may represent the minimum IOPS setting of the volume. For example, in relation to blocks 420, a volume may satisfy the first QoS setting and the second QoS setting when the maximum IOPS setting of the volume is greater than a first threshold and the minimum IOPS setting of the volume is less than a second threshold. In relation to the block 430, a volume of the subset may satisfy an upper bound of a range based on the minimum IOPS setting when the volume does not exceed the upper bound of a range between the minimum IOPS setting and the maximum IOPS setting during the time window. For example, a subset of the volumes may be determined, where each volume of the subset does not exceed an upper bound of a minimum-to-maximum range during the time window. A non-limiting example of the specific application of the generalized approach of FIG. 4 with respect to decreasing the maximum IOPS setting for a particular volume is described further below with reference to FIG. 8.

In some examples, the minimum and maximum IOPS settings of a volume may be set too close together. In such examples, it may be desirable to increase the burst IOPS setting of the volume to allow the volume to handle sharp spikes in I/O for a short period of time. A non-limiting example of an automated approach for determining whether and how to increase the burst IOPS settings of volumes is described below with reference to FIG. 5.

Figure 5:
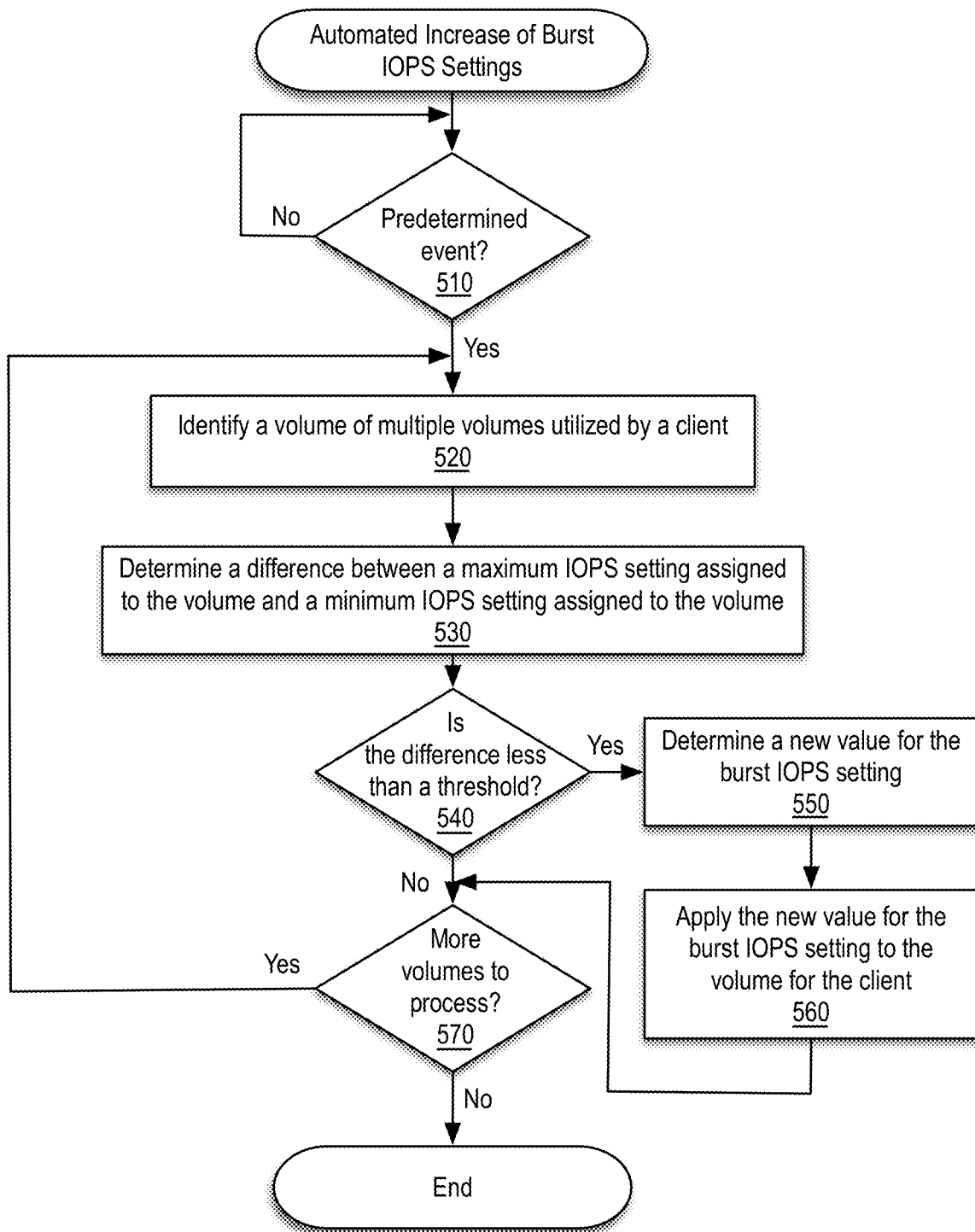
FIG. 5 is a flow diagram illustrating a set of operations for automatically increasing burst input/output per second (IOPS) settings of a volume based on minimum and maximum IOPS settings of the volume being too closer together in accordance with an embodiment of the present disclosure.

FIG. 5 is a flow diagram illustrating a set of operations for automatically increasing burst IOPS settings of a volume based on minimum and maximum IOPS settings of the volume being too closer together in accordance with an embodiment of the present disclosure. At decision block 510, it is determined whether a predetermined event has occurred. If so, processing continues with block 520; otherwise, processing loops back to decision block 510. Depending upon the particular implementation, the predetermined event may represent expiration of a timer (e.g., X minutes, Y hours, or Z days), a system metric crossing a threshold, a workload characteristic crossing a threshold, or a request by a client. At block 520, a volume of a multiple of volumes utilized by a client is identified.

At block 530, a difference between a maximum IOPS setting assigned to the volume and a minimum IOPS setting assigned to the volume for the client is determined. For each volume used by the client, the client may set the minimum IOPS setting and/or the maximum IOPS setting of the volume. At a later point in time, the client may change the minimum IOPS setting and/or the maximum IOPS setting of the volume. The minimum IOPS value should be less than the maximum IOPS and may guarantee performance regardless of system conditions or application activity. The maximum IOPS setting value may refer to the maximum IOPS that a volume can process over a sustained period of time. The larger the difference, the larger the range between the maximum IOPS setting and the minimum IOPS setting. The smaller the difference, the smaller the range between the maximum IOPS setting and the minimum IOPS setting. When the difference between the maximum IOPS setting and the minimum IOPS setting is too small (e.g., less than a configurable or predefined threshold), the system's performance may degrade if, for example, a volume experiences a spike in demand well above the minimum IOPS setting of the volume.

At decision block 540, a determination is made regarding whether the difference is less than a threshold. If so, then processing branches to block 550; otherwise, processing continues with decision block 570. In an example, the threshold is fifty IOPS (as just one non-limiting example of a numeric value), and it is determined whether the difference between the maximum IOPS setting and the minimum IOPS setting is less than the threshold of fifty IOPS. The QoS tuning module (e.g., QoS tuning module 215) may determine that if the difference is less than the threshold, the distributed storage system (e.g., cluster 135) is likely to experience performance degradation. To mitigate the performance degradation, it may be desirable to increase a value of the burst IOPS setting of the volume to allow the volume to perform beyond its regular maximum IOPS setting for a longer period of time than would have otherwise been allowed with a non-adjusted burst IOPS setting. As noted above, burst IOPS credits may be accrued when the volume has been performing at fewer than the maximum IOPS value for an extended amount of time. For example, a volume may accrue one burst IOPS credit for each unit of time (e.g., 1 second) the volume performs under the maximum IOPS value, and the volume may spend or use one burst IOPS credit for each unit of time the volume operates above the maximum IOPS value. A volume may accrue a maximum number of burst IOPS credits (e.g., sixty burst IOPS credits).

In one embodiment, the QoS tuning module may perform additional or alternative actions to determine whether to update the burst IOPS setting. For example, the QoS tuning module may determine whether the respective volume is idle. When the QoS tuning module determines the volume is idle, then the QoS tuning module may determine to not trigger an update to the current value of the burst IOPS setting and proceed with decision block 570. In another embodiment, the QoS tuning module may determine whether the maximum IOPS setting and/or the minimum IOPS setting are intentionally set to their respective values. When the QoS tuning module determines the maximum IOPS setting and/or the minimum IOPS setting are intentionally set to their respective values, the QoS tuning module may determine to not trigger an update to the current value of the burst IOPS setting and proceed with decision block 570.

At block 550, a new value for the burst IOPS setting is determined that is greater than the current value of the burst IOPS setting. Depending upon the particular implementation, the current value of the burst IOPS setting may be increased by a constant factor or by a dynamic factor dependent upon the range between the maximum and minimum IOPS settings. For example, the size of the dynamic factor may be directly related to the size of the range, thereby increasing the current value of the burst IOPS setting more when the maximum and minimum IOPS settings are further apart together than when they are closer together. As noted above, in some examples, the constant or dynamic factor may be configurable to allow an administrative user of the distributed storage system to make the auto-adjustments more or less aggressive. In one embodiment, the QoS tuning module may restore a default setting for the burst IOPS setting of the volume if the default is higher than the current value of the burst IOPS setting.

At block 560, the new value of the burst IOPS setting is applied to the volume for the client. For example, the QoS tuning module may store the new value to a centralized service so as to facilitate access to the new value and application of the new value of the burst IOPS setting to the volume for the client by a QoS module (e.g., QoS module 211) of the storage node of the cluster running a slice service 220 including the volume at issue.

At decision block 570, a determination is made regarding whether another volume is to be processed. If so, processing loops back to block 520 where another volume utilized by the client is identified; otherwise, processing for the volumes utilized by the client is complete. According to one embodiment, all volumes or a subset of all volumes for a client may be processed. When decision block 570 is entered as a result of the no branch of decision block 540, the difference between the maximum IOPS setting and the minimum IOPS setting is not less than the threshold, indicating the minimum and maximum IOPS settings are far enough apart, potentially resulting in no or less performance degradation based on these current QoS settings than would result if such QoS settings were changed.

In addition to examples in which the minimum and maximum IOPS settings may be too close together, in some other examples the maximum IOPS and the burst IOPS settings of a volume may be set too close together. In such examples, it may again be desirable to increase the burst IOPS setting of the volume to allow the volume to handle sharp spikes in I/O for a short period of time. A non-limiting example of an automated approach for determining whether and how to increase the burst IOPS settings of volumes is described below with reference to FIG. 6.

Figure 6:
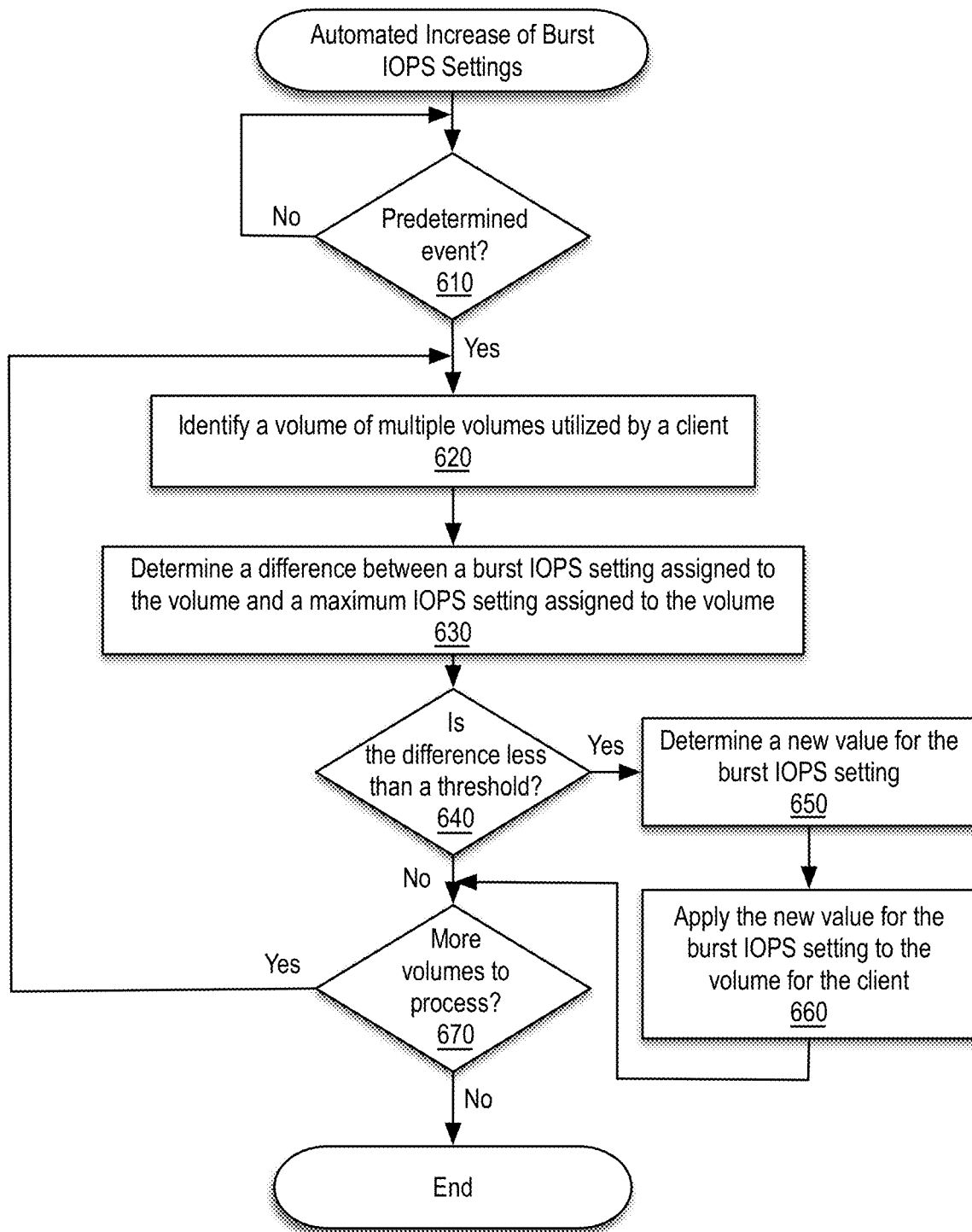
FIG. 6 is a flow diagram illustrating a set of operations for automatically increasing burst IOPS settings of a volume based on maximum and burst IOPS settings of the volume being too close together in accordance with an embodiment of the present disclosure.

FIG. 6 is a flow diagram illustrating a set of operations for automatically increasing burst IOPS settings of a volume based on maximum and burst IOPS settings of the volume being too close together in accordance with an embodiment of the present disclosure. At decision block 610, it is determined whether a predetermined event has occurred. If so, processing continues with block 620; otherwise, processing loops back to decision block 610. Depending upon the particular implementation, the predetermined event may represent expiration of a timer (e.g., X minutes, Y hours, or Z days), a system metric crossing a threshold, a workload characteristic crossing a threshold, or a request by a client. At block 620, a volume of a multiple of volumes utilized by a client is identified.

At block 630, a difference between a burst IOPS setting and a maximum IOPS setting assigned to the volume for the client is determined. For each volume used by the client, the client may set the burst IOPS setting and/or the maximum IOPS setting of the volume. At a later point in time, the client may change the burst IOPS setting and/or the maximum IOPS setting of the volume. When the difference between the burst IOPS setting and the maximum IOPS setting is too small (e.g., less than a configurable or predefined threshold), the system's performance may degrade if, for example, a volume experiences a spike in demand well above the maximum IOPS setting of the volume.

At decision block 640, a determination is made regarding whether the difference is less than a threshold. If so, then processing branches to block 650; otherwise, processing continues with decision block 670. In an example, the threshold is fifty IOPS (as just one non-limiting example of a numeric value), and it is determined whether the difference between the burst IOPS setting and the maximum IOPS setting is less than the threshold of fifty IOPS. The QoS tuning module (e.g., QoS tuning module 215) may determine that if the difference is less than the threshold, the distributed storage system (e.g., cluster 135) is likely to experience performance degradation. To mitigate the performance degradation, it may be desirable to increase a value of the burst IOPS setting of the volume to allow the volume to perform beyond its regular maximum IOPS setting for a longer period of time than would have otherwise been allowed with a non-adjusted burst IOPS setting.

In one embodiments, the QoS tuning module may perform additional or alternative actions to determine whether to update the burst IOPS setting. For example, the QoS tuning module may determine whether the respective volume is idle. When the QoS tuning module determines the volume is idle, then the QoS tuning module may determine to not trigger an update to the current value of the burst IOPS setting and proceed with decision block 670. In another embodiment, the QoS tuning module may determine whether the maximum IOPS setting and/or the burst IOPS setting are intentionally set to their respective values. When the QoS tuning module determines the maximum IOPS setting and/or the burst IOPS setting are intentionally set to their respective values, the QoS tuning module may determine to not trigger an update to the current value of the burst IOPS setting and proceed with decision block 670.

At block 870, a new value for the maximum IOPS setting is determined that is lower than the current value of the maximum IOPS setting. Depending upon the particular implementation, the current value of the burst IOPS setting may be increased by a constant factor or by a dynamic factor dependent upon the range between the maximum and minimum IOPS settings. For example, the size of the dynamic factor may be inversely related to the size of the range, thereby increasing the current value of the burst IOPS setting more when the maximum and minimum IOPS settings are closer together than when they are further apart. As noted above, in some examples, the constant or dynamic factor may be configurable to allow an administrative user of the distributed storage system to make the auto-adjustments more or less aggressive. In one embodiment, the QoS tuning module may restore a default setting for the maximum IOPS setting of the volume if the default is less than the current value of the maximum IOPS setting.

At block 660, the new value of the burst IOPS setting is applied to the volume for the client. For example, the QoS tuning module may store the new value to a centralized service so as to facilitate access to the new value and application of the new value of the maximum IOPS setting to the volume for the client by a QoS module (e.g., QoS module 211) of the storage node of the cluster running a slice service 220 including the volume at issue.

At decision block 670, a determination is made regarding whether another volume is to be processed. If so, processing loops back to block 620 where another volume utilized by the client is identified; otherwise, processing for the volumes utilized by the client is complete. According to one embodiment, all volumes or a subset of all volumes for a client may be processed. When decision block 670 is entered as a result of the no branch of decision block 640, the difference between the burst IOPS setting and the maximum IOPS setting is not less than the threshold, indicating the burst and maximum IOPS settings are far enough apart, potentially resulting in no or less performance degradation based on these current QoS settings than would result if such QoS settings were changed.

In some examples, the minimum IOPS setting of a volume may be set too high (e.g., the volume rarely processes enough IOPS operations to reach the minimum IOPS setting) for the volume's workloads. When the minimum IOPS setting of a volume is set too high, then too much I/O may be allocated from other volumes to a volume that does not need it. In such examples, it may be desirable to decrease the minimum IOPS setting of the volume. A non-limiting example of an automated approach for determining whether and how to decrease the minimum IOPS settings of volumes is described below with reference to FIG. 7.

Figure 7:
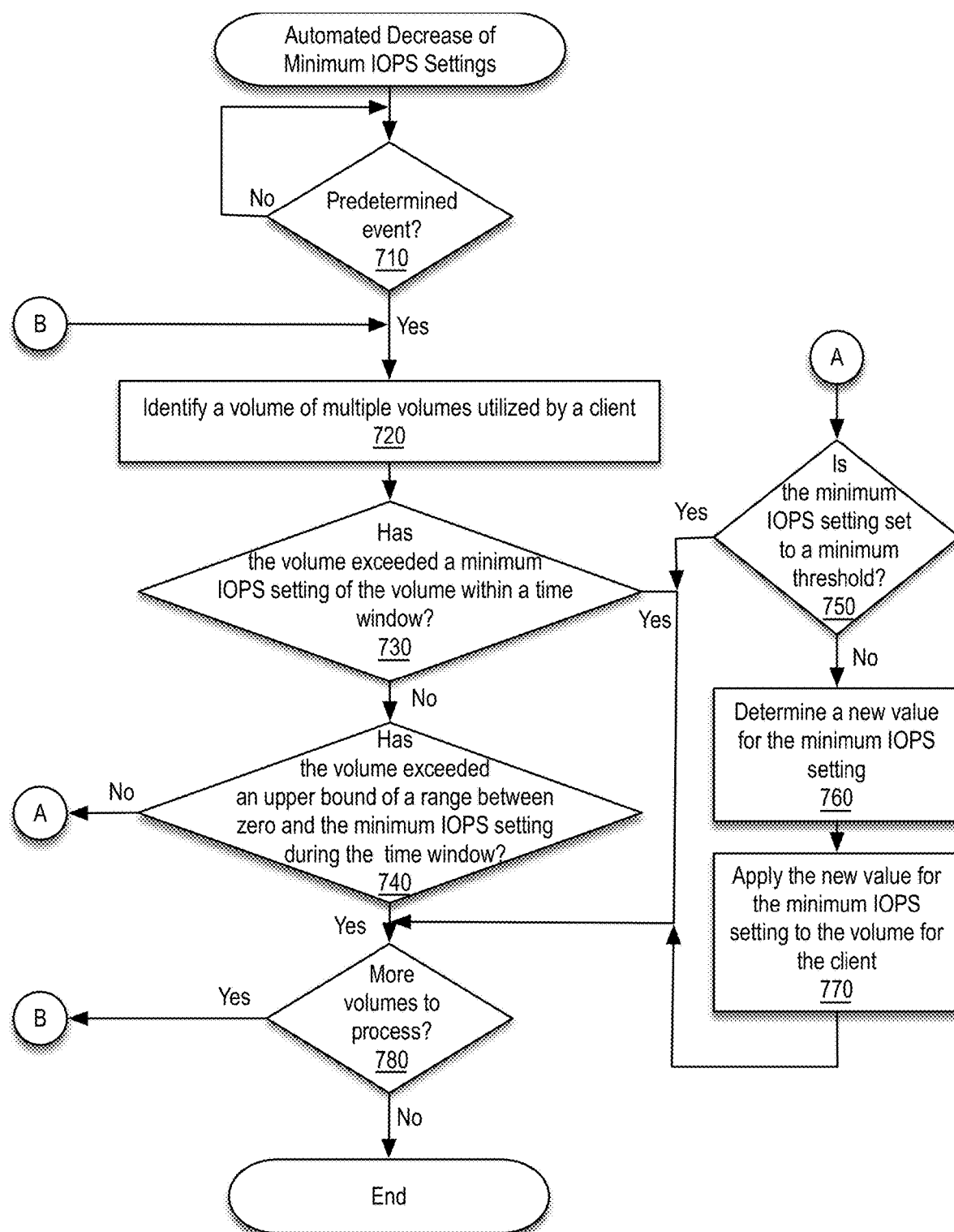
FIG. 7 is a flow diagram illustrating a set of operations for automatically decreasing minimum IOPS settings of a volume in accordance with an embodiment of the present disclosure.

FIG. 7 is a flow diagram illustrating a set of operations for automatically decreasing minimum IOPS settings of a volume in accordance with an embodiment of the present disclosure. At decision block 710, it is determined whether a predetermined event has occurred. If so, processing continues with block 720; otherwise, processing loops back to decision block 710. Depending upon the particular implementation, the predetermined event may represent expiration of a timer (e.g., X minutes, Y hours, or Z days), a system metric crossing a threshold, a workload characteristic crossing a threshold, or a request by a client. At block 720, a volume of a multiple of volumes utilized by a client is identified.

At decision block 730, a determination is made regarding whether the volume has exceeded a minimum IOPS setting of the volume within a time window. A volume has exceeded the minimum IOPS setting within the time window when any workload processed on the volume has exceeded the minimum IOPS setting within the time window. In some examples, the QoS tuning module may receive below-minimum data from the QoS module (e.g., QoS module 211). The below-minimum data may include including QoS metrics that track a number of observations in which the volume is operating at below the minimum IOPS setting of the volume during the time window. For example, if the minimum IOPS setting is set to 1,000 IOPS (as just one non-limiting example of a numeric value), then the below-minimum data may include a count indicative of the amount of time in which the volume is operating at below 1,000 IOPS within the time window. The QoS tuning module may determine a below-minimum range that is between zero and the minimum IOPS setting, and the below-minimum range may be further partitioned into subranges, with each below-minimum subrange covering a distribution of values. In an example (for purposes of illustration only), the below-minimum range may be partitioned into quintiles, and the QoS tuning module may determine a first below-minimum subrange including 0 to 199 IOPS (e.g., a first quintile), a second below-minimum subrange including 200 to 399 IOPS (e.g., a second quintile), a third below-minimum subrange including 400 to 599 IOPS (e.g., a third quintile), a fourth below-minimum subrange including 600 to 799 IOPS (e.g., a fourth quintile), and a fifth below-minimum subrange including 800 to 999 IOPS (e.g., a fifth quintile).

The first below-minimum subrange may include a count of the amount of time in which the volume is operating between 0 and 199 IOPS within the time window. The second below-minimum subrange may include a count of the amount of time in which the volume is operating between 200 and 399 IOPS within the time window. The third below-minimum subrange may include a count of the amount of time in which the volume is operating between 400 and 599 IOPS within the time window. The fourth below-minimum subrange may include a count of the amount of time in which the volume is operating between 600 and 799 IOPS within the time window. The fifth below-minimum subrange may include a count of the amount of time in which the volume is operating between 800 and 999 IOPS within the time window.

In some examples, the QoS tuning module may additionally receive minimum-to-maximum data from the QoS module. The minimum-to-maximum data may include a number of observations in which the volume is operating between the minimum IOPS setting and the maximum IOPS setting of the volume during the time window. For example, if the minimum IOPS setting is set to 1,000 IOPS and the maximum IOPS setting is set to 25,000 IOPS (for purposes of illustration only), then the minimum-to-maximum data may include a count indicative of the amount of time in which the volume is operating between 1,000 and 25,000 IOPS within the time window. The QoS tuning module may determine a minimum-to-maximum range that is between the minimum IOPS setting (e.g., 1,000 IOPS) and the maximum IOPS setting (e.g., 25,000 IOPS), and the minimum-to-maximum may be further partitioned into subranges, with each minimum-to-maximum subrange covering a distribution of values. The minimum-to-maximum range may be further partitioned to determine how effective the minimum and maximum IOPS settings are relative to the volume's workload(s).

In an example, the minimum-to-maximum range may be partitioned into quintiles, and the QoS tuning module may determine a first minimum-to-maximum subrange including 1,000 to 5,799 IOPS (e.g., a first quintile), a second minimum-to-maximum subrange including 5,800 to 10,599 IOPS (e.g., a second quintile), a third minimum-to-maximum subrange including 10,600 to 15,399 IOPS (e.g., a third quintile), a fourth minimum-to-maximum subrange including 15,400 to 20,199 IOPS (e.g., a fourth quintile), and a fifth minimum-to-maximum subrange including 20,200 to 25,000 IOPS (e.g., a fifth quintile).

The first minimum-to-maximum subrange may include a count of the amount of time in which the volume is operating between 1,000 and 5,799 IOPS within the time window. The second minimum-to-maximum subrange may include a count of the amount of time in which the volume is operating between 5,800 and 10,599 IOPS within the time window. The third minimum-to-maximum subrange may include a count of the amount of time in which the volume is operating between 10,600 and 15,399 IOPS within the time window. The fourth minimum-to-maximum subrange may include a count of the amount of time in which the volume is operating between 15,400 and 20,199 IOPS within the time window. The fifth minimum-to-maximum subrange may include a count of the amount of time in which the volume is operating between 20,200 and 25,000 IOPS within the time window.

When the volume has observations within the first to fifth minimum-to-maximum subranges (i.e. the first to fifth quintiles) during the time window, then the QoS tuning module may determine the volume has exceeded the minimum IOPS setting of the volume within the time window. Although the distribution of data may be discussed in relation to quintiles in this example, other examples may have different data distributions (e.g., quartiles, etc.). When the volume has exceeded the minimum IOPS setting of the volume within the time window, then it may be likely that the volume will operate at least at or beyond the minimum IOPS setting. Accordingly, it may be undesirable to decrease the minimum IOPS setting of the volume. In this instance, processing branches to decision block 780.

In contrast, if the volume has not exceeded the minimum IOPS setting of the volume within the time window, then it may be unlikely that the volume will operate at least at or beyond the minimum IOPS setting. Accordingly, it may be likely that the minimum IOPS setting of the volume can be decreased without degrading system performance. In this instance, processing continues with decision block 740.

At decision block 740, a determination is made regarding whether the volume has exceeded an upper bound of a range between zero and the minimum IOPS setting during the time window. The QoS tuning module may determine the upper bound, which may be a number or a percentage of the distribution of below-minimum data. In keeping with the above example in which the below-minimum range is partitioned into quintiles, the upper bound may be 600 IOPS and accordingly include observations in which the volume is operating at 600 to 999 IOPS or may be the fourth quintile of the below-minimum range and accordingly include observations in which the volume is operating at the fourth or fifth quintile of the below-minimum range.

When the volume has exceeded the upper bound of the range between zero and the minimum IOPS setting during the time window, then the volume may be operating closer to the minimum IOPS setting and it may be likely that the volume will operate at least at or beyond the minimum IOPS setting. Accordingly, it may be undesirable to decrease the minimum IOPS setting of the volume. In this instance, processing continues with decision block 780.

In contrast, still with respect to decision block 740, when the volume has not exceeded the upper bound of the range between zero and the minimum IOPS setting during the time window, then the volume may be operating well below the minimum IOPS setting and it may be desirable to decrease the minimum IOPS setting of the volume. For example, the volume may be operating at least at sixty percent below the minimum IOPS setting of the volume within the time window, and all observations in which the volume is operating below the minimum IOPS setting within the time window fall within the first, second, or third below-minimum subranges. In this example, the QoS tuning module may determine that the volume is consistently operating at least at sixty percent below the minimum IOPS setting within the time window. If the volume has not exceeded the upper bound of the range between zero and the minimum IOPS setting during the time window, processing may branch to decision block 750.

At decision block 750, a determination is made regarding whether the minimum IOPS setting is set to a minimum threshold. The minimum threshold may represent the lowest IOPS value that the volume should be set to for the minimum IOPS setting. If the minimum IOPS setting is set at the minimum threshold, it may be undesirable to further decrease the minimum IOPS setting. In this instance, processing may branch to decision block 780. In contrast, if the minimum IOPS setting is not set at the minimum threshold, it may be desirable to further decrease the minimum IOPS setting because the volume rarely processes workloads that require the minimum IOPS value. In this instance, processing may continue with block 760.

At block 760, a new value for the minimum IOPS setting is determined that is less than the current value of the minimum IOPS setting. In some examples, the QoS tuning module may select an IOPS value below the upper bound of the range between zero and the minimum IOPS setting of the volume. Depending upon the particular implementation, the current value of the minimum IOPS setting may be decreased by a constant factor or by a dynamic factor dependent upon a difference between a peak IOPS observation and the upper bound. For example, the size of the dynamic factor may be directly related to the difference, thereby decreasing the current value of the minimum IOPS setting more when the upper bound and the peak IOPS observation are further apart than when they are closer together. As noted above, in some examples, the constant or dynamic factor may be configurable to allow an administrative user of the distributed storage system to make the auto-adjustments more or less aggressive. In one embodiment, the QoS tuning module may restore a default setting for the minimum IOPS setting of the volume if the default is less than the current value of the minimum IOPS setting. Alternatively, the QoS tuning module may select the minimum threshold value as the new value.

At block 760, the new value of the minimum IOPS setting is applied to the volume for the client. For example, the QoS tuning module may store the new value to a centralized service so as to facilitate access to the new value and application of the new value of the minimum IOPS setting to the volume for the client by a QoS module (e.g., QoS module 211) of the storage node of the cluster running a slice service 220 including the volume at issue.

At decision block 780, a determination is made regarding whether another volume is to be processed. If so, processing loops back to block 720 where another volume utilized by the client is identified; otherwise, processing for the volumes utilized by the client is complete. According to one embodiment, all volumes or a subset of all volumes for a client may be processed.

In some other examples, the maximum IOPS setting of a volume may be set too high (e.g., the volume rarely processes IOPS operations close to (or within a threshold of) the maximum IOPS setting) for the volume's workloads. In such examples, it may be desirable to decrease the maximum IOPS setting of the volume. A non-limiting example of an automated approach for determining whether and how to decrease the maximum IOPS settings of volumes is described below with reference to FIG. 8.

Figure 8:
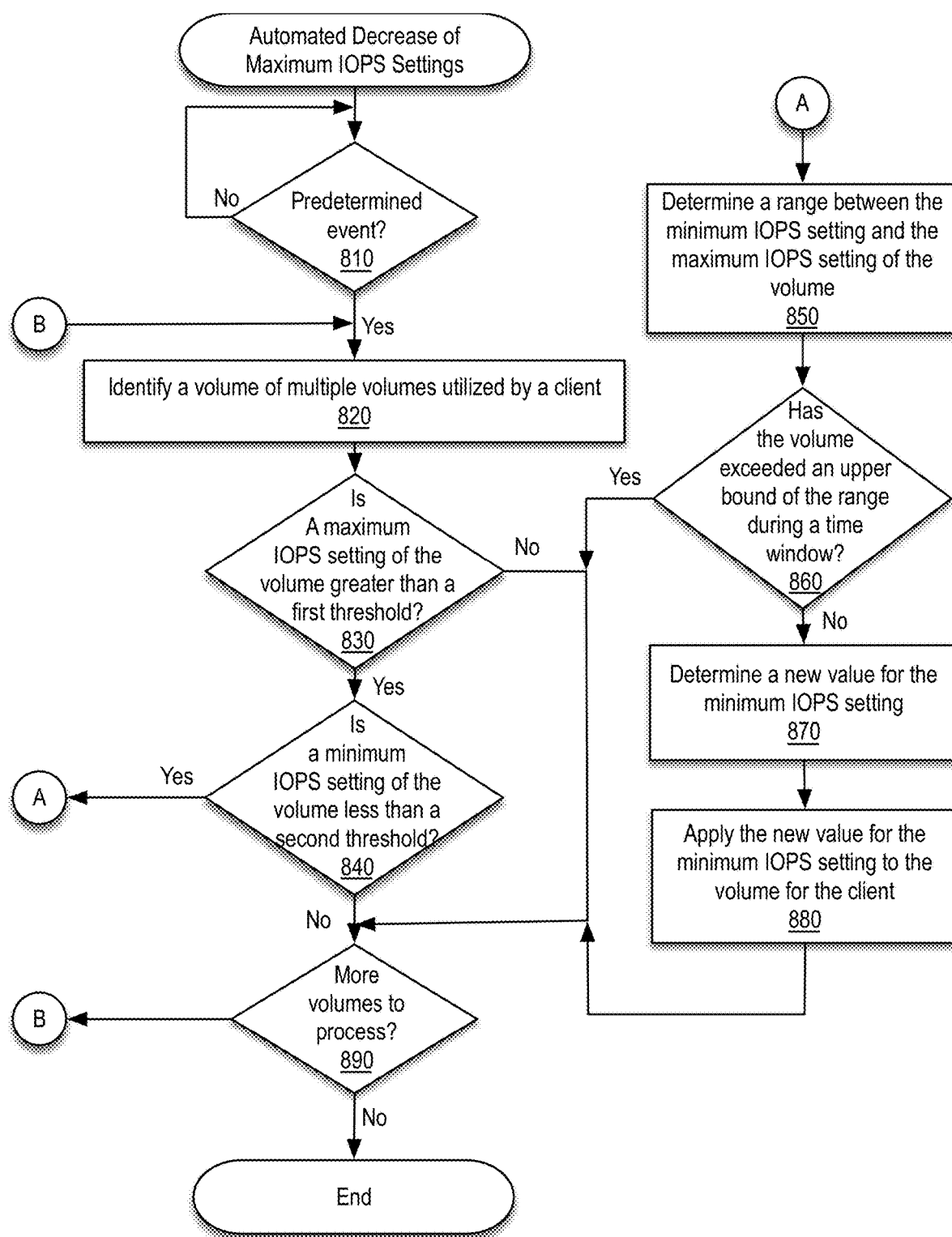
FIG. 8 is a flow diagram illustrating a set of operations for automatically decreasing maximum IOPS settings of a volume in accordance with an embodiment of the present disclosure.

FIG. 8 is a flow diagram illustrating a set of operations for automatically decreasing maximum IOPS settings of a volume in accordance with an embodiment of the present disclosure. At decision block 810, it is determined whether a predetermined event has occurred. If so, processing continues with block 820; otherwise, processing loops back to decision block 810. Depending upon the particular implementation, the predetermined event may represent expiration of a timer (e.g., X minutes, Y hours, or Z days), a system metric crossing a threshold, a workload characteristic crossing a threshold, or a request by a client. At block 820, a volume of a multiple of volumes utilized by a client is identified.

At decision block 830, a determination is made regarding whether a maximum IOPS setting of the volume is greater than a first threshold. If so, then processing continues with decision block 840; otherwise, processing branches to decision block 890.

At decision block 840, a determination is made regarding whether a minimum IOPS setting of the volume is less than a second threshold. If so, then processing branches to block 850; otherwise, processing continues with decision block 890.

At block 850, a range is determined between the minimum IOPS setting and the maximum IOPS setting of the volume. In an example, the QoS tuning module may determine a minimum-to-maximum range between the minimum IOPS setting and the maximum IOPS setting.

At decision block 860, a determination is made regarding whether the volume has exceeded an upper bound of the range (e.g., minimum-to-maximum range) during a time window.

In relation to block 850 and decision block 860 and using the above example discussed with reference to FIG. 7 (for purposes of illustration only) in which the minimum IOPS setting is set to 1,000 IOPS and the maximum IOPS setting is set to 25,000 IOPS, the QoS tuning module may determine that the range in block 850 is 1,000 IOPS to 25,000 IOPS. The QoS tuning module may determine the upper bound, which may be a number or a percentage of the distribution of minimum-to-maximum data. In keeping with the above example in which the minimum-to-maximum range is partitioned into quintiles, the upper bound may be 10,600 IOPS and accordingly include observations in which the volume is operating at 10,600 to 25,000 IOPS or may be the third quintile of the minimum-to-maximum range and may accordingly include observations in which the volume is operating at the third, fourth, or fifth quintile of the minimum-to-maximum range.

If the volume has exceeded the upper bound of the range between the minimum IOPS setting and the maximum IOPS setting during the time window, then the volume may be operating closer to the maximum IOPS setting and it may be likely that the volume will operate at least at or beyond the maximum IOPS setting. Accordingly, it may be undesirable to decrease the maximum IOPS setting of the volume. In this instance, processing branches to decision block 890.

In contrast, if the volume has not exceeded the upper bound of the range between the minimum IOPS setting and the maximum IOPS setting during the time window, then the volume may be operating well below the maximum IOPS setting and it may be desirable to decrease the maximum IOPS setting of the volume. In this example, all observations in which the volume is operating within the time window fall within the first or second minimum-to-maximum subranges. If the volume has not exceeded the upper bound of the range between the minimum IOPS setting and the maximum IOPS setting during the time window, processing continues with block 870.

At block 870, a new value for the maximum IOPS setting is determined that is less than the current value of the maximum IOPS setting. Depending upon the particular implementation, the current value of the maximum IOPS setting may be decreased by a constant factor or by a dynamic factor dependent upon a difference between a peak IOPS observation and the upper bound. For example, the size of the dynamic factor may be directly related to the difference, thereby decreasing the current value of the maximum IOPS setting more when the upper bound and the peak IOPS observation are further apart than when they are closer together. As noted above, in some examples, the constant or dynamic factor may be configurable to allow an administrative user of the distributed storage system to make the auto-adjustments more or less aggressive. In one embodiment, the QoS tuning module may restore a default setting for the maximum IOPS setting of the volume if the default is lower than the current value of the maximum IOPS setting.

At block 880, the new value of the maximum IOPS setting is applied to the volume for the client. For example, the QoS tuning module may store the new value to a centralized service so as to facilitate access to the new value and application of the new value of the maximum IOPS setting to the volume for the client by a QoS module (e.g., QoS module 211) of the storage node of the cluster running a slice service 220 including the volume at issue.

At decision block 890, a determination is made regarding whether another volume is to be processed. If so, processing loops back to block 820 where another volume utilized by the client is identified; otherwise, processing for the volumes utilized by the client is complete. According to one embodiment, all volumes or a subset of all volumes for a client may be processed.

In some other examples, if the minimum IOPS setting of a volume is set too low (e.g., the volume typically processes more IOPS operations than the minimum IOPS setting), then the volume may be starved of IOPS for workloads running on the volume. In such examples, it may be desirable to increase the minimum IOPS setting of the volume. A non-limiting example of an automated approach for determining whether and how to increase the minimum IOPS settings of volumes is described below with reference to FIG. 9.

Figure 9:
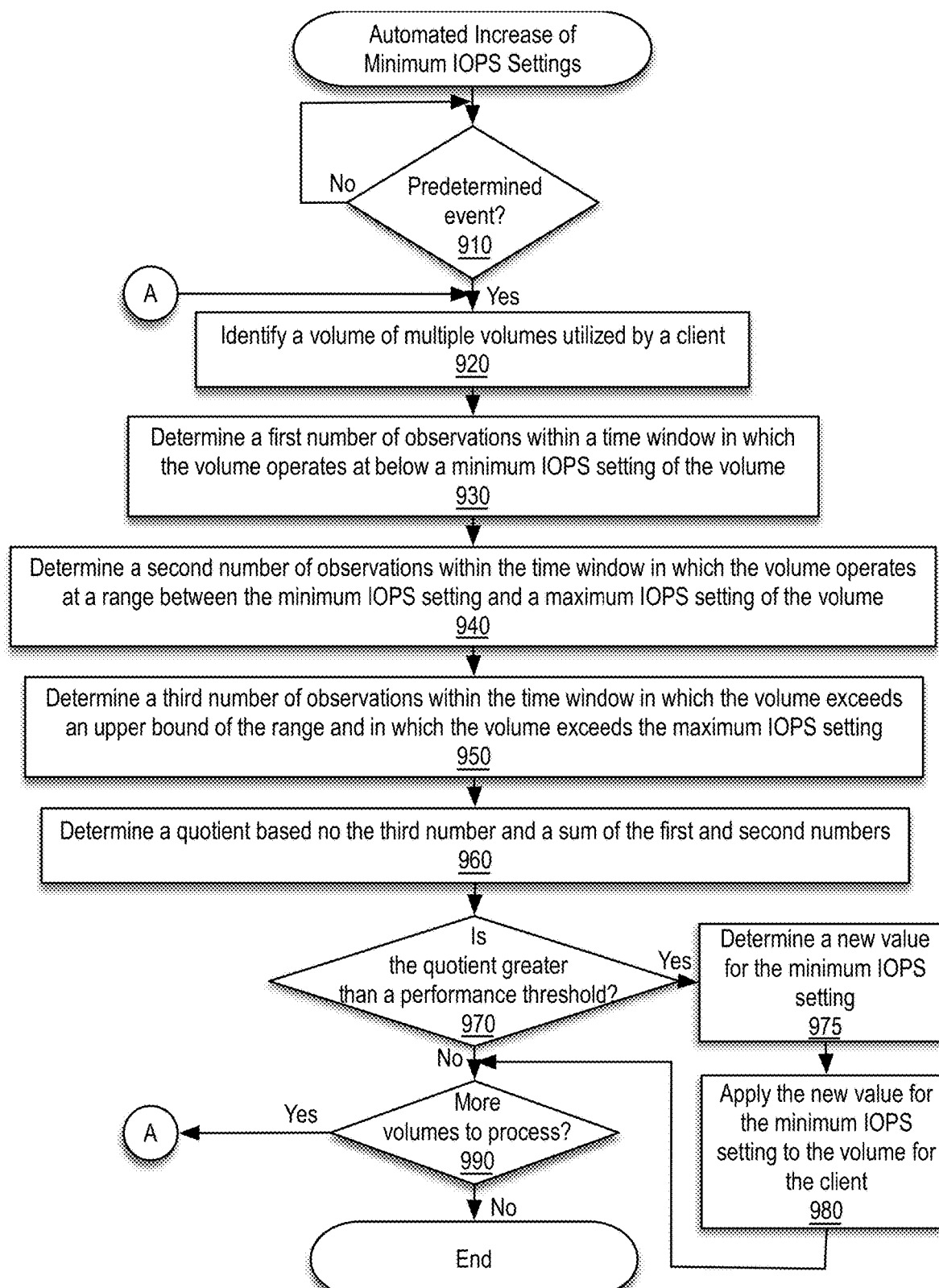
FIG. 9 is a flow diagram illustrating a set of operations for automatically increasing minimum IOPS settings of a volume in accordance with an embodiment of the present disclosure.

FIG. 9 is a flow diagram illustrating a set of operations for automatically increasing minimum IOPS settings of a volume in accordance with an embodiment of the present disclosure. At decision block 910, it is determined whether a predetermined event has occurred. If so, processing continues with block 920; otherwise, processing loops back to decision block 910. Depending upon the particular implementation, the predetermined event may represent expiration of a timer (e.g., X minutes, Y hours, or Z days), a system metric crossing a threshold, a workload characteristic crossing a threshold, or a request by a client. At block 920, a volume of a multiple of volumes utilized by a client is identified.

At block 930, a first number of observations within a time window in which the volume operates at below a minimum IOPS setting of the volume is determined. In some examples, if the minimum IOPS setting is set to 1,000 IOPS (for purposes of illustration only), then the first number of observations may include a count indicative of the amount of time in which the volume is operating at below 1,000 IOPS within the time window.

At block 940, a second number of observations within the time window in which the volume operates at a range between the minimum IOPS setting and a maximum IOPS setting of the volume is determined. In some examples, if the minimum IOPS setting is set to 1,000 IOPS and the maximum IOPS setting is set to 25,000 IOPS (for purposes of illustration only), then the second number of observations may include a count indicative of the amount of time in which the volume is operating between the range of 1,000 and 25,000 IOPS within the time window.

At block 950, a third number of observations within the time window in which the volume exceeds an upper bound of the range (e.g., minimum-to-maximum range) and in which the volume exceeds the maximum IOPS setting is determined. Using the above example in FIG. 7 (for sake of illustration) in which the minimum IOPS setting is set to 1,000 IOPS and the maximum IOPS setting is set to 25,000 IOPS, the QoS tuning module may determine that the range is 1,000 IOPS to 25,000 IOPS. The QoS tuning module may determine the upper bound, which may be a number or a percentage of the distribution of minimum-to-maximum data.

In keeping with the above example in which the minimum-to-maximum range is partitioned into quintiles, the upper bound may be 10,600 IOPS and may accordingly include a number of observations in which the volume is operating at 10,600 to 25,000 IOPS or may be the third quintile of the minimum-to-maximum range and accordingly include a number of observations in which the volume is operating at the third, fourth, and fifth quintile of the minimum-to-maximum range. Additionally, the volume exceeds the maximum IOPS setting if the volume is operating above 25,000 IOPS. In this example, the third number of observations may include a count indicative of the amount of time in which the volume exceeds the upper bound of the range within the time window (e.g., operating between the range of 10,600 and 25,000 IOPS within the time window) and in which the volume exceeds the maximum IOPS setting within the time window.

At block 960, a quotient is determined based on the third number and a sum of the first and second numbers. The sum of the first and second numbers may represent the total number of observations in which the volume operates at below the minimum IOPS setting and in which the volume operates between the minimum IOPS setting and the maximum IOPS setting. In an example, the QoS tuning module may determine the quotient by dividing the third number by a sum of the first and second numbers. The quotient may indicate a proportion of times in which the volume is operating at least at, for example, forty percent above the minimum IOPS setting of the volume.

At decision block 970, a determination is made regarding whether the quotient is greater than a performance threshold. The QoS tuning module may determine whether the quotient is greater than a performance threshold. In an example, the performance threshold is 0.5 and the QoS tuning module may determine whether the volume is operating above the upper bound of the range (e.g., the volume is operating at least at forty percent above the minimum IOPS setting of the volume) for greater than fifty percent of the sum of the first and second number of observations.

If the quotient is not greater than the performance threshold, then the QoS tuning module may determine the volume does not process enough IOPS on a consistent basis to warrant an increase to the minimum IOPS setting of the volume. In this instance, processing may continue with decision block 990. In contrast, if the quotient is greater than the performance threshold, then the QoS tuning module may determine the volume processes enough IOPS on a consistent basis to warrant an increase to the minimum IOPS setting of the volume. For example, the QoS tuning module may determine that if the minimum IOPS setting is not increased, the volume may exceed the minimum IOPS setting, potentially degrading performance. If the quotient is greater than the performance threshold, processing branches to block 975.

At block 975, a new value for the minimum IOPS setting is determined that is greater than the current value of the minimum IOPS setting. In some examples, the QoS tuning module may select a new value for the minimum IOPS setting that is above the upper bound of the range between the minimum IOPS setting and the maximum IOPS setting. Depending upon the particular implementation, the current value of the minimum IOPS setting may be increased by a constant factor or by a dynamic factor dependent upon the third number. For example, the size of the dynamic factor may be directly related to the third number, thereby increasing the current value of the minimum IOPS setting more when the third number is indicative of the volume spending more time operating in excess of the upper bound as compared to when the volume spends less time operating in excess of the upper bound. As noted above, in some examples, the constant or dynamic factor may be configurable to allow an administrative user of the distributed storage system to make the auto-adjustments more or less aggressive. In one embodiment, the QoS tuning module may restore a default setting for the minimum IOPS setting of the volume if the default is higher than the current value of the minimum IOPS setting.

At block 980, the new value of the minimum IOPS setting is applied to the volume for the client. For example, the QoS tuning module may store the new value to a centralized service so as to facilitate access to the new value and application of the new value of the minimum IOPS setting to the volume for the client by a QoS module (e.g., QoS module 211) of the storage node of the cluster running a slice service 220 including the volume at issue.

At decision block 990, a determination is made regarding whether another volume is to be processed. If so, processing loops back to block 920 where another volume utilized by the client is identified; otherwise, processing for the volumes utilized by the client is complete. According to one embodiment, all volumes or a subset of all volumes for a client may be processed.

In some other examples, if the maximum IOPS setting of a volume is set too low (e.g., the volume typically processes more IOPS operations than the maximum IOPS setting) and the volume's workload does not reach the burst IOPS setting assigned to the volume, then the volume may be throttled along with the volumes on that volume's slice service, resulting in degradation of performance for the entire slice service. In such examples, it may be desirable to increase the maximum IOPS setting of the volume. A non-limiting example of an automated approach for determining whether and how to increase the maximum IOPS settings of volumes is described below with reference to FIG. 10.

Figure 10:
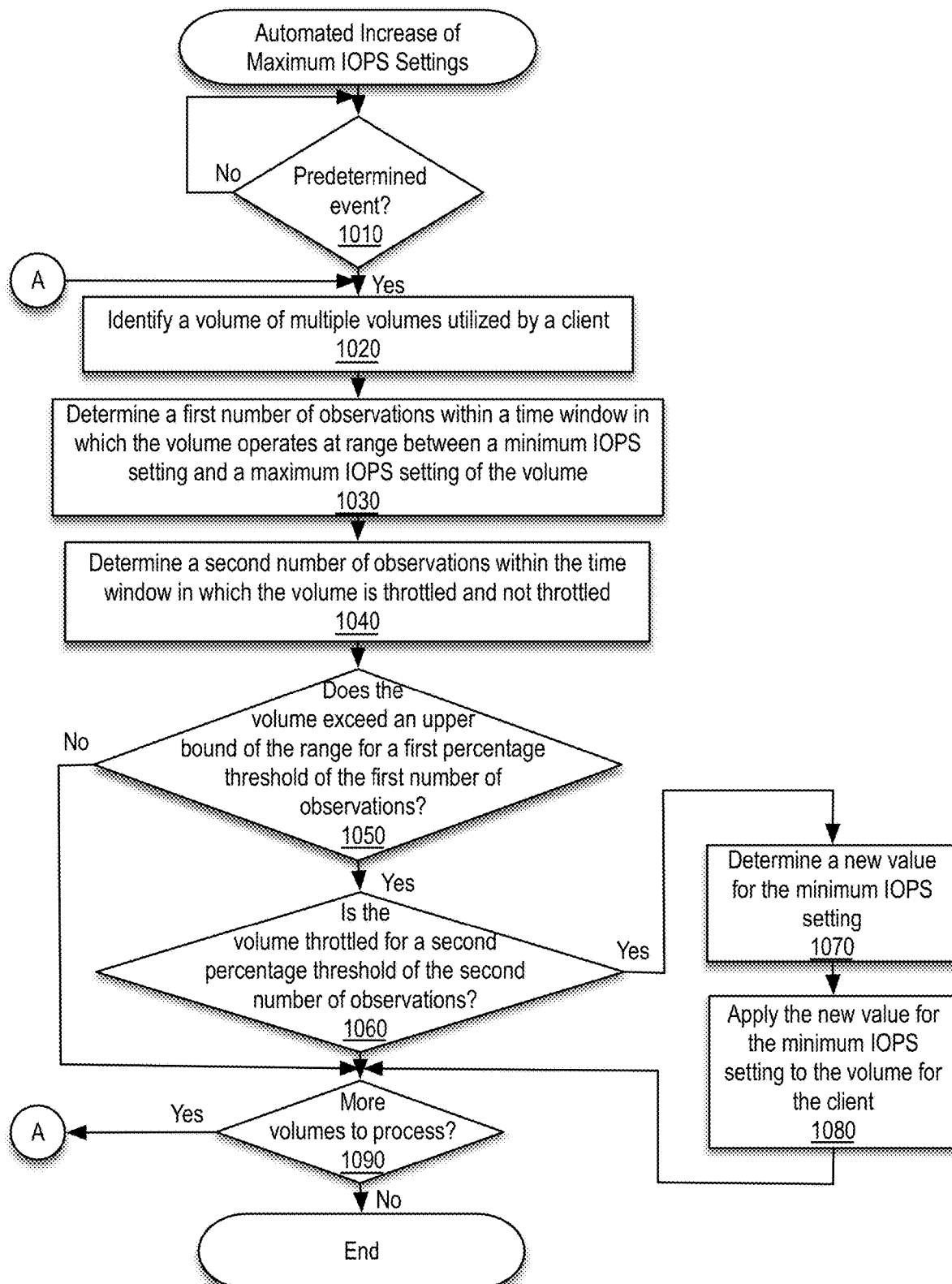
FIG. 10 is a flow diagram illustrating a set of operations for automatically increasing maximum IOPS settings of a volume in accordance with an embodiment of the present disclosure.

FIG. 10 is a flow diagram illustrating a set of operations for automatically increasing maximum IOPS settings of a volume in accordance with an embodiment of the present disclosure. At decision block 1010, it is determined whether a predetermined event has occurred. If so, processing continues with block 1020; otherwise, processing loops back to decision block 1010. Depending upon the particular implementation, the predetermined event may represent expiration of a timer (e.g., X minutes, Y hours, or Z days), a system metric crossing a threshold, a workload characteristic crossing a threshold, or a request by a client. At block 1020, a volume of a multiple of volumes utilized by a client is identified.

At block 1030, a first number of observations within a time window is determined in which the volume operates at a range between a minimum IOPS setting and a maximum IOPS setting of the volume. Using the above example (by way of illustration only) in which the minimum IOPS setting may be set to 1,000 IOPS and the maximum IOPS setting may be set to 25,000 IOPS, the QoS tuning module may determine a minimum-to-maximum range between the minimum IOPS setting of 1,000 IOPS and the maximum IOPS setting of 25,000 IOPS.

As discussed above, if the minimum-to-maximum range is partitioned into five minimum-to-maximum subranges, with each minimum-to-maximum subrange covering twenty percent, then the QoS tuning module may determine a first minimum-to-maximum subrange including 1,000 to 5,799 IOPS (e.g., a first quintile), a second minimum-to-maximum subrange including 5,800 to 10,599 IOPS (e.g., a second quintile), a third minimum-to-maximum subrange including 10,600 to 15,399 IOPS (e.g., a third quintile), a fourth minimum-to-maximum subrange including 15,400 to 20,199 IOPS (e.g., a fourth quintile), and a fifth minimum-to-maximum subrange including 20,200 to 25,000 IOPS (e.g., a fifth quintile). The first number of observations may be a total number of observations in which the volume operates between 1,000 IOPS and 25,000 IOPS.

At block 1040, a second number of observations within the time window is determined in which the volume is throttled and in which the volume is not throttled within the time window.

At decision block 1050, a determination is made regarding whether the volume exceeds an upper bound of the range for at least a first percentage threshold of the first number of observations. The QoS tuning module may determine the upper bound, which may be a number or a percentage of the distribution of minimum-to-maximum data. In keeping with the above example in which the minimum-to-maximum range is partitioned into quintiles, the upper bound may be 20,200 IOPS and accordingly include observations in which the volume is operating above 20,200 IOPS to 25,000 IOPS or may be the fifth quintile of the minimum-to-maximum range and may accordingly include observations in which the volume is operating at the fifth quintile of the minimum-to-maximum range. In an example, the first percentage threshold is twenty percent, and the QoS tuning module may determine whether the volume falls between 20,200 and 25,000 IOPS for at least twenty percent of the first number of observations within the time window.

If the volume does not exceed the upper bound of the range for at least the first percentage threshold of the first number of observations, then the volume may not be operating close enough to the maximum IOPS setting for a sufficient amount of time and it may be unlikely that volume will operate beyond the maximum IOPS setting. Accordingly, it may be undesirable to increase the maximum IOPS setting of the volume. In this instance, processing branches to decision block 1090.

In contrast, if the volume exceeds the upper bound of the range for at least the first percentage threshold of the first number of observations, then the volume may be operating close enough to the maximum IOPS setting for a sufficient amount of time and it may be likely that volume will operate beyond the maximum IOPS setting. Accordingly, it may be desirable to increase the maximum IOPS setting of the volume. In this instance, processing continues with decision block 1080.

At decision block 1060, a determination is made regarding whether the volume is throttled for at least a second percentage threshold of the second number of observations. For example, the QoS tuning module may determine whether the volume is throttled for at least the percentage threshold of the second number of observations. In an example, the second percentage threshold is fifty percent, and the QoS tuning module may determine whether the volume is throttled for at least fifty percent of the second number of observations.

If the volume is not throttled for at least the second percentage threshold of the second number of observations, then the volume may not be operating above the maximum IOPS setting beyond the burst IOPS setting for a sufficient amount of time. Accordingly, it may be undesirable to increase the maximum IOPS setting of the volume. In this instance, processing continue with decision block 1090. In contrast, if the volume is throttled for at least the second percentage threshold of the second number of observations, then the volume may experience enough throttling to degrade system performance. Accordingly, it may be desirable to increase the maximum IOPS setting of the volume. In this instance, processing branches to block 1070.

At block 1070, a new value for the maximum IOPS setting is determined that is greater than the current value of the maximum IOPS setting. Depending upon the particular implementation, the current value of the maximum IOPS setting may be increased by a constant factor or by a dynamic factor dependent upon the percentage of time the volume is throttled. For example, the size of the dynamic factor may be directly related to the percentage of time the volume is throttled during the time window, thereby increasing the current value of the maximum IOPS setting more when the volume experiences more throttling as compared to when the volume experiences less throttling. As noted above, in some examples, the constant or dynamic factor may be configurable to allow an administrative user of the distributed storage system to make the auto-adjustments more or less aggressive. In one embodiment, the QoS tuning module may restore a default setting for the maximum IOPS setting of the volume if the default is higher than the current value of the maximum IOPS setting.

At block 1080, the new value of the maximum IOPS setting is applied to the volume for the client. For example, the QoS tuning module may store the new value to a centralized service so as to facilitate access to the new value and application of the new value of the maximum IOPS setting to the volume for the client by a QoS module (e.g., QoS module 211) of the storage node of the cluster running a slice service 220 including the volume at issue.

At decision block 1090, a determination is made regarding whether another volume is to be processed. If so, processing loops back to block 1020 where another volume utilized by the client is identified; otherwise, processing for the volumes utilized by the client is complete. According to one embodiment, all volumes or a subset of all volumes for a client may be processed.

In some other examples, a volume's IOPS settings may not be allowing for appropriate throttling to take place. If the maximum IOPS setting of a volume is set too high (e.g., the volume operates at significantly less that its target IOPS when it is being throttled), then it may be desirable to decrease the maximum IOPS so as to allow appropriate back pressure to be applied to this volume when the need arises. Target IOPS refers to a value that may be periodically (e.g., every 500 ms) output by the QoS modules (e.g., QoS module 211) and representing how hard to push back on (i.e., throttle) volumes. In a sunny day case, with no throttling, target IOPS for a given volume is the sum of the maximum IOPS setting and the burst IOPS setting for the given volume. In a rainy day scenario, target IOPS is less than the maximum IOPS setting. A non-limiting example of an automated approach for determining whether and how to increase the maximum IOPS settings of volumes is described below with reference to FIG. 11.

Figure 11:
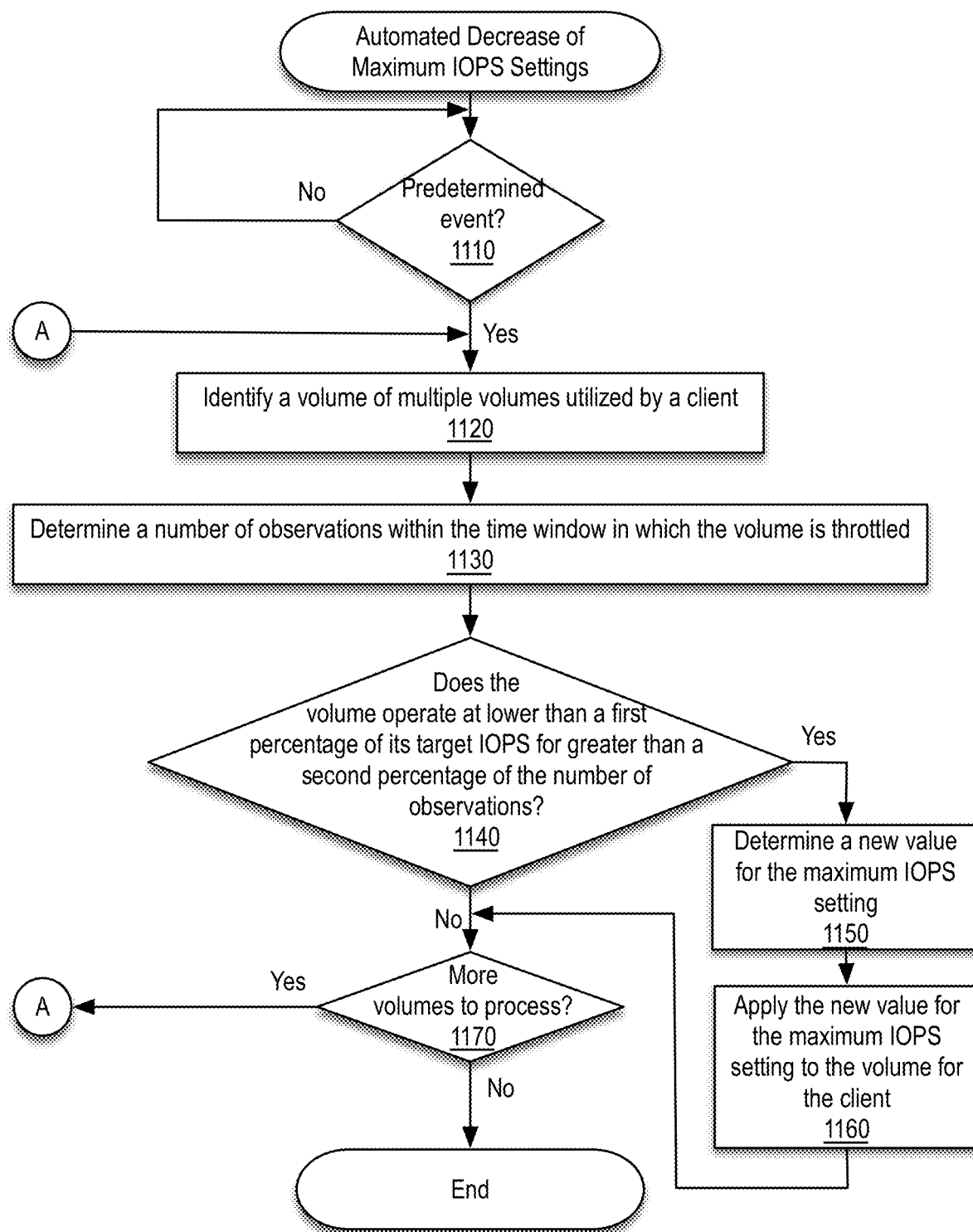
FIG. 11 is a flow diagram illustrating a set of operations for automatically decreasing maximum IOPS settings of a volume based on a target IOPS setting for the volume in accordance with an embodiment of the present disclosure.

FIG. 11 is a flow diagram illustrating a set of operations for automatically decreasing maximum IOPS settings of a volume based on a target IOPS setting for the volume in accordance with an embodiment of the present disclosure. At decision block 1110, it is determined whether a predetermined event has occurred. If so, processing continues with block 1120; otherwise, processing loops back to decision block 1110. Depending upon the particular implementation, the predetermined event may represent expiration of a timer (e.g., X minutes, Y hours, or Z days), a system metric crossing a threshold, a workload characteristic crossing a threshold, or a request by a client. At block 1120, a volume of a multiple of volumes utilized by a client is identified.

At block 1130, a number of observations within a time window is determined in which the volume is throttled.

At decision block 1140, a determination is made regarding whether the volume operates at lower than a first percentage of its target IOPS for greater than a second percentage of the number of observations. If so, processing branches to block 1150; otherwise, processing continues with decision block 1170. In some examples, the determination may involve the QoS tuning module evaluating whether the volume operates at 50% or less of its target IOPS for 95% or more of the number of observations.

At block 1150, a new value for the maximum IOPS setting is determined that is less than the current maximum IOPS. Depending upon the particular implementation, the current value of the maximum IOPS setting may be decreased by a constant factor or by a dynamic factor dependent upon a difference between actual percentage of its target IOPS at which it was observed to operate during the time window and the first percentage. For example, the size of the dynamic factor may be directly related to the difference, thereby decreasing the current value of the maximum IOPS setting more when the volume operates at a lower percentage of its target IOPS as compared to when the volume operates at a higher percentage of its target IOPS when it is being throttled. As noted above, in some examples, the constant or dynamic factor may be configurable to allow an administrative user of the distributed storage system to make the auto-adjustments more or less aggressive. In one embodiment, the QoS tuning module may restore a default setting for the maximum IOPS setting of the volume if the default is lower than the current value of the maximum IOPS setting.

At block 1160, the new value of the maximum IOPS setting is applied to the volume for the client. For example, the QoS tuning module may store the new value to a centralized service so as to facilitate access to the new value and application of the new value of the maximum IOPS setting to the volume for the client by a QoS module (e.g., QoS module 211) of the storage node of the cluster running a slice service 220 including the volume at issue.

At decision block 1170, a determination is made regarding whether another volume is to be processed. If so, processing loops back to block 1120 where another volume utilized by the client is identified; otherwise, processing for the volumes utilized by the client is complete. According to one embodiment, all volumes or a subset of all volumes for a client may be processed.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 12:
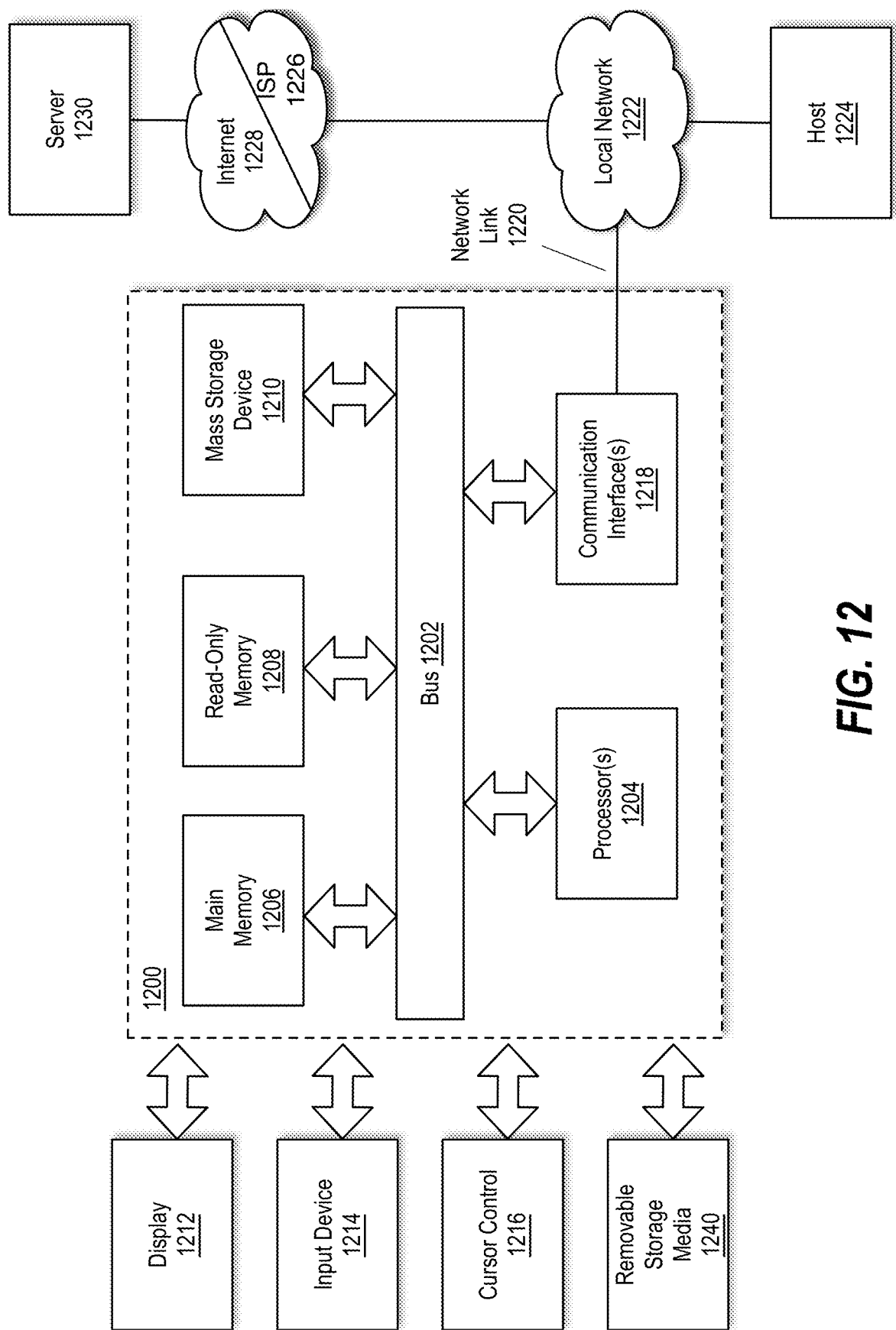
FIG. 12 illustrates an example computer system in which or with which embodiments of the present disclosure may be utilized.

FIG. 12 is a block diagram that illustrates a computer system 1200 in which or with which an embodiment of the present disclosure may be implemented. Computer system 1200 may be representative of all or a portion of the computing resources associated with a storage node (e.g., storage node 136), a collector (e.g., collector 138), a monitoring system (e.g., monitoring system 122) or an administrative workstation or client (e.g., computer system 110). Notably, components of computer system 1200 described herein are meant only to exemplify various possibilities. In no way should example computer system 1200 limit the scope of the present disclosure. In the context of the present example, computer system 1200 includes a bus 1202 or other communication mechanism for communicating information, and a processing resource (e.g., a hardware processor 1204) coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, e.g., a magnetic disk, optical disk or flash disk (made of flash memory chips), is provided and coupled to bus 1202 for storing information and instructions.

Computer system 1200 may be coupled via bus 1202 to a display 1212, e.g., a cathode ray tube (CRT), Liquid Crystal Display (LCD), Organic Light-Emitting Diode Display (OLED), Digital Light Processing Display (DLP) or the like, for displaying information to a computer user. An input device 1214, including alphanumeric and other keys, is coupled to bus 1202 for communicating information and command selections to processor 1204. Another type of user input device is cursor control 1216, such as a mouse, a trackball, a trackpad, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Removable storage media 1240 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1200 may implement the techniques described herein using customized hard-wired logic, one or more ASICs or FPGAs, firmware or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1210. Volatile media includes dynamic memory, such as main memory 1206. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the worldwide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. The received code may be executed by processor 1204 as it is received, or stored in storage device 1210, or other non-volatile storage for later execution.

What is claimed is:

1. A method performed by one or more processors of a distributed storage system having a plurality of storage nodes organized as a cluster, the method comprising:
    monitoring one or more characteristics of a workload of a client to which a storage node of the plurality of storage nodes is exposed;
    determining that a characteristic of the one or more characteristics meets or exceeds a predetermined or configurable threshold; and
    after said determining,
        obtaining information regarding a plurality of Quality of Service (QoS) settings assigned to a volume of the storage node that is being utilized by the client;
        calculating a new value of a burst input/output operations per second (IOPS) setting of the plurality of QoS settings by increasing a current value of the burst IOPS setting by a factor dependent upon a first QoS setting of the plurality of QoS settings and a second QoS setting of the plurality of QoS settings; and
        assigning the new value of the burst IOPS setting to the volume for the client.

2. The method of claim 1, wherein the characteristic comprises a total number of IOPS.

3. The method of claim 1, wherein the first QoS setting comprises a minimum IOPS setting and the second QoS setting comprises a maximum IOPS setting.

4. The method of claim 3, wherein the factor comprises a portion of a difference between a current value of the minimum IOPS setting and a current value of the maximum IOPS setting.

5. The method of claim 4, wherein the portion represents a dynamic factor that increases as the size of the difference increases.

6. The method of claim 4, wherein the portion is configurable by a user of the distributed storage system.

7. A distributed storage system comprising:
one or more processing resources; and
instructions that when executed by the one or more processing resources cause the distributed storage system to:
monitor one or more characteristics of a workload of a client to which a storage node of a plurality of storage nodes of the distributed storage system is exposed;
determine that a characteristic of the one or more characteristics meets or exceeds a predetermined or configurable threshold; and
after a determination that the characteristic meets or exceeds the predetermined or configurable threshold,
obtain information regarding a plurality of Quality of Service (QoS) settings assigned to a volume of the storage node that is being utilized by the client;
calculate a new value of a burst input/output operations per second (IOPS) setting of the plurality of QoS settings by increasing a current value of the burst IOPS setting by a factor dependent upon a first QoS setting of the plurality of QoS settings and a second QoS setting of the plurality of QoS settings; and
assign the new value of the burst IOPS setting to the volume for the client.

8. The distributed storage system of claim 7, wherein the characteristic comprises a total number of IOPS.

9. The distributed storage system of claim 7, wherein the factor is indicative of a desired degree of aggressiveness in connection with increasing the burst IOPS setting.

10. The distributed storage system of claim 7, wherein the first QoS setting comprises a minimum IOPS setting and the second QoS setting comprises a maximum IOPS setting.

11. The distributed storage system of claim 10, wherein the factor comprises a portion of a difference between a current value of the minimum IOPS setting and a current value of the maximum IOPS setting.

12. The distributed storage system of claim 11, wherein the portion represents a dynamic factor that increases as the size of the difference increases.

13. The distributed storage system of claim 11, wherein the portion is configurable by a user of the distributed storage system.

14. A non-transitory computer-readable storage medium embodying a set of instructions, which when executed by one or more processing resources of a distributed storage system, cause the distributed storage system to:
monitor one or more characteristics of a workload of a client to which a storage node of a plurality of storage nodes of the distributed storage system is exposed;
determine that a characteristic of the one or more characteristics meets or exceeds a predetermined or configurable threshold; and
after a determination that the characteristic meets or exceeds the predetermined or configurable threshold,
obtain information regarding a plurality of Quality of Service (QoS) settings assigned to a volume of the storage node that is being utilized by the client;
calculate a new value of a burst input/output operations per second (IOPS) setting of the plurality of QoS settings by increasing a current value of the burst IOPS setting by a factor dependent upon a first QoS setting of the plurality of QoS settings and a second QoS setting of the plurality of QoS settings; and
assign the new value of the burst IOPS setting to the volume for the client.

15. The non-transitory computer-readable storage medium of claim 14, wherein the characteristic comprises a total number of IOPS.

16. The non-transitory computer-readable storage medium of claim 14, wherein the factor is indicative of a desired degree of aggressiveness in connection with increasing the burst IOPS setting.

17. The non-transitory computer-readable storage medium of claim 14, wherein the first QoS setting comprises a minimum IOPS setting and the second QoS setting comprises a maximum IOPS setting.

18. The non-transitory computer-readable storage medium of claim 17, wherein the factor comprises a portion of a difference between a current value of the minimum IOPS setting and a current value of the maximum IOPS setting.

19. The non-transitory computer-readable storage medium of claim 18, wherein the portion represents a dynamic factor that increases as the size of the difference increases.

20. The non-transitory computer-readable storage medium of claim 18, wherein the portion is configurable by a user of the distributed storage system.

* * * * *